US009724861B2

(12) United States Patent
Antunes et al.

(10) Patent No.: US 9,724,861 B2
(45) Date of Patent: Aug. 8, 2017

(54) FAST ACTING REDUCED VELOCITY PIN CONTROL

(71) Applicant: Synventive Molding Solutions, Inc., Peabody, MA (US)

(72) Inventors: Sergio Ribeiro de Oliveira Antunes, Scottsdale, AZ (US); Zuang Rui Tan, Peabody, MA (US); Mark Moss, Boxford, MA (US); Christopher Lee, Beverly, MA (US); Vito Galati, Rowley, MA (US)

(73) Assignee: Synventive Molding Solutions, Inc., Peabody, MA (US)

( * ) Notice: Subject to any disclaimer, the term of this patent is extended or adjusted under 35 U.S.C. 154(b) by 286 days.

(21) Appl. No.: 14/791,554

(22) Filed: Jul. 6, 2015

(65) Prior Publication Data
US 2015/0306803 A1    Oct. 29, 2015

Related U.S. Application Data

(60) Continuation of application No. PCT/US2014/019210, filed on Feb. 28, 2014, and a
(Continued)

(51) Int. Cl.
*B29C 45/80*        (2006.01)
*B29C 45/27*        (2006.01)
(Continued)

(52) U.S. Cl.
CPC ........ *B29C 45/2703* (2013.01); *B29C 45/281* (2013.01); *B29C 45/77* (2013.01);
(Continued)

(58) Field of Classification Search
CPC .............. B29C 45/2703; B29C 45/281; B29C 2045/2872
See application file for complete search history.

(56) References Cited

U.S. PATENT DOCUMENTS 2,012,248 A    8/1935    Rayfield
5,460,201 A    10/1995   Borcea et al.
(Continued)

OTHER PUBLICATIONS

Written Opinion of the Int'l. Preliminary Examining Authority mailed Feb. 3, 2015 in Int'l. Appln. PCT/US2014/019210.
(Continued)

*Primary Examiner* — James Sanders
(74) *Attorney, Agent, or Firm* — Polsinelli PC

(57) ABSTRACT

Apparatus and method for performing an injection molding cycle using the apparatus where the apparatus comprises:
a manifold, a pneumatic actuator driven by a pneumatic valve assembly,
the actuator driving a valve pin between a gate closed position and a maximum injection fluid flow position,
the pneumatic valve assembly having a spool supported within a cylinder driven by a drive device that is supported solely by and translates together with the spool,
a controller that instructs the pneumatic valve assembly to cause the actuator to drive the valve pin either upstream or downstream to selected positions or at selected velocities during the course of a single injection cycle based on a feedback signal indicative of position of the pin or actuator or pressure of an injection fluid material.

16 Claims, 13 Drawing Sheets

Related U.S. Application Data continuation of application No. PCT/US2014/031000, filed on Mar. 18, 2014, and a continuation-in-part of application No. 14/567,369, filed on Dec. 11, 2014, now Pat. No. 9,636,858, which is a division of application No. 13/484,336, filed on May 31, 2012, now Pat. No. 9,011,736, which is a continuation of application No. PCT/US2011/062099, filed on Nov. 23, 2011, application No. 14/791,554, which is a continuation-in-part of application No. 14/567,308, filed on Dec. 11, 2014, now Pat. No. 9,623,598, which is a division of application No. 13/484,408, filed on May 31, 2012, now Pat. No. 9,005,509, which is a continuation of application No. PCT/US2011/062096, filed on Nov. 23, 2011.

(51) Int. Cl.
  *B29C 45/28* (2006.01)
  *B29C 45/77* (2006.01)
  *B29L 31/00* (2006.01)
  *B29C 45/17* (2006.01)

(52) U.S. Cl.
  CPC ...... *B29C 2045/1792* (2013.01); *B29C 2045/279* (2013.01); *B29C 2045/2712* (2013.01); *B29C 2045/2865* (2013.01); *B29C 2045/2872* (2013.01); *B29C 2945/76076* (2013.01); *B29C 2945/76277* (2013.01); *B29C 2945/76381* (2013.01); *B29C 2945/76545* (2013.01); *B29C 2945/76598* (2013.01); *B29C 2945/76755* (2013.01); *B29C 2945/76859* (2013.01); *B29C 2945/76933* (2013.01); *B29L 2031/772* (2013.01)

(56) References Cited

U.S. PATENT DOCUMENTS

| | | |
|---|---|---|
| 6,589,039 B1 | 7/2003 | Doughty et al. |
| 2002/0086086 A1 | 7/2002 | Doyle et al. |
| 2010/0225025 A1 | 9/2010 | Striegel |

OTHER PUBLICATIONS

Apr. 3, 2015 Response to Written Opinion of the Int'l. Preliminary Examining Authority mailed Feb. 3, 2015 in Int'l. Appln. PCT/US2014/019210.

Int'l. Search Report and Written Opinion mailed Jun. 12, 2014 in Int'l. Appln. PCT/US2014/019210.

Oct. 7, 2014 Response to Int'l. Search Report and Written Opinion mailed Jun. 12, 2014 in Int'l. Appln. PCT/US2014/019210.

Hydraulic R-DDV Servovalves data sheet, HR Textron, Textron Systems, Santa Clarita, CA.

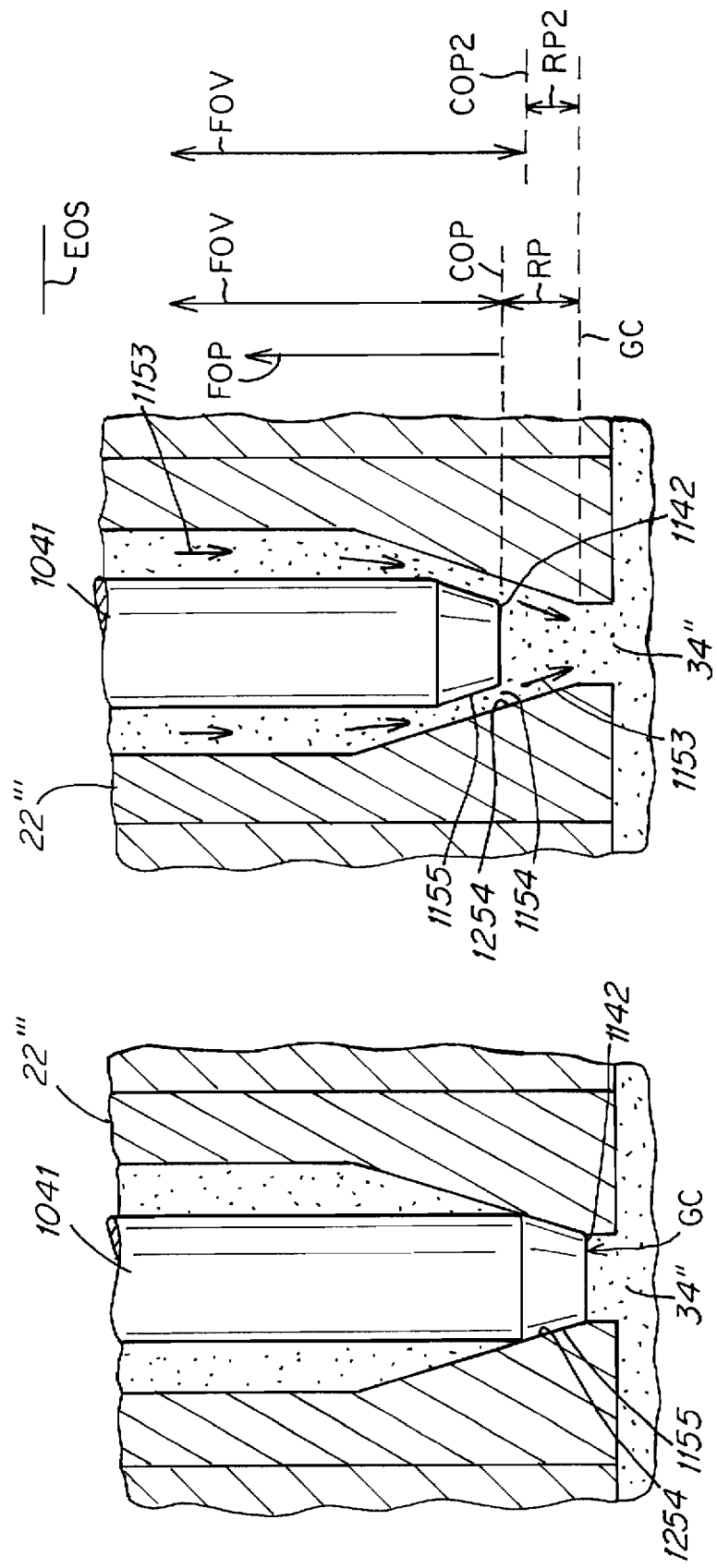

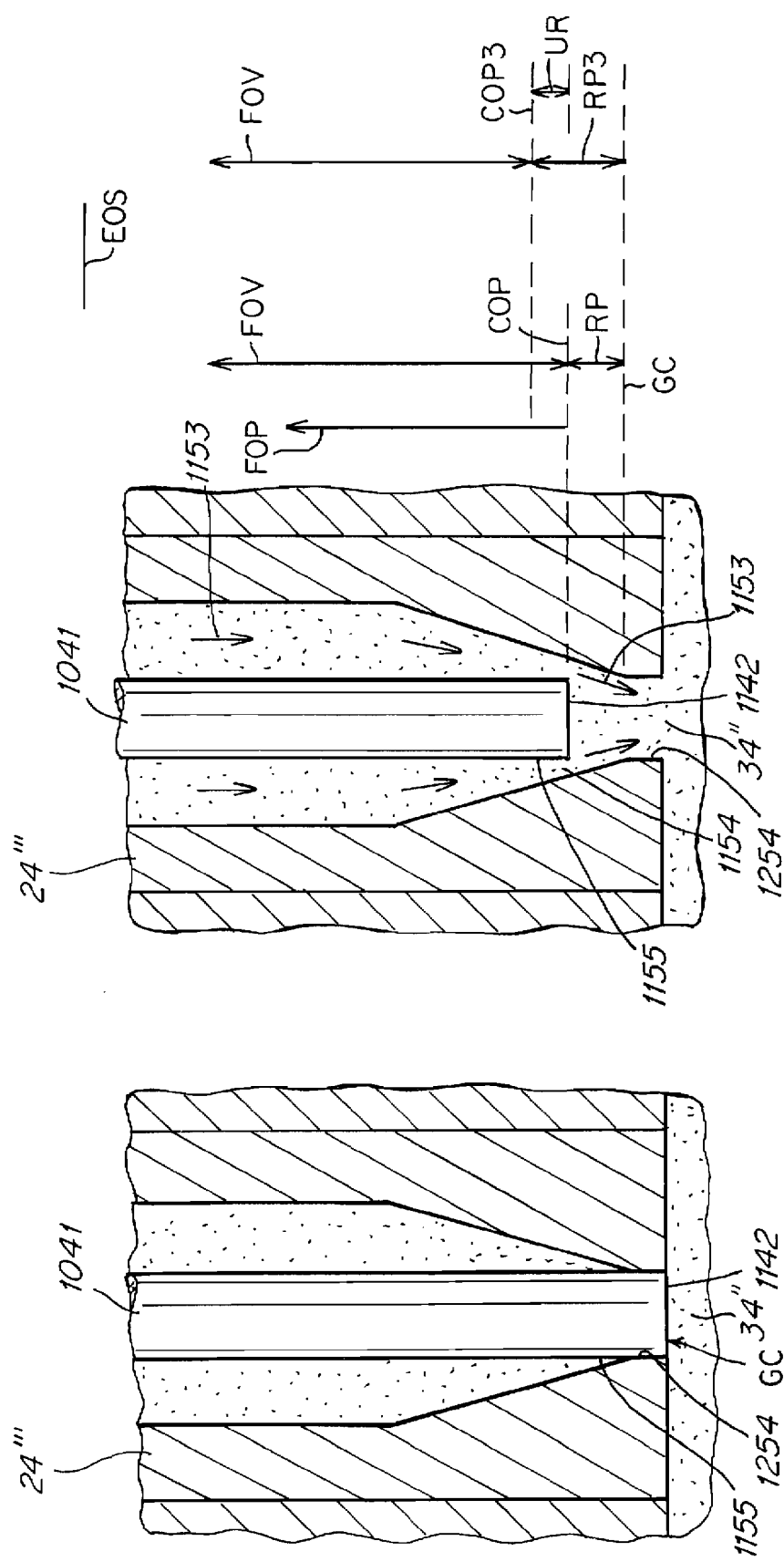

FAST ACTING REDUCED VELOCITY PIN CONTROL

RELATED APPLICATIONS

This application is a continuation of and claims the benefit of priority to PCT/US14/019210 (7129WO1), the disclosure of which is incorporated by reference as if fully set forth herein.

This application is also a continuation of and claims the benefit of priority to PCT/US14/31000 (7129WO2), the disclosure of which is incorporated by reference as if fully set forth herein.

This application is a continuation-in-part of and claims the benefit of priority to U.S. application Ser. No. 14/567,369 filed Dec. 11, 2014 which is a divisional of U.S. application Ser. No. 13/484,336 filed May 31, 2012, which is a continuation of PCT/US2011/062099 filed Nov. 23, 2011, the disclosures of all of the foregoing are incorporated by reference in their entirety as if fully set forth herein.

This application is also a continuation-in-part of and claims the benefit of priority to U.S. application Ser. No. 14/567,308 filed Dec. 11, 2014 which is a divisional of U.S. application Ser. No. 13/484,408 filed May 31, 2012 which is a continuation of PCT/US2011/062096 filed Nov. 23, 2011, the disclosures of all of the foregoing are incorporated by reference in their entirety as if fully set forth herein.

The disclosures of all of the following are incorporated by reference in their entirety as if fully set forth herein: U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068), U.S. application Ser. No. 10/101,278 filed Mar. 19, 2002 (7070) and PCT application no. PCT/US2011/029721 filed Mar. 24, 2011 (7094), PCTUS2011062099 (7100WO0) filed Nov. 23, 2011 and PCTUS2011062096 (7100WO1) filed Nov. 23, 2011.

BACKGROUND OF THE INVENTION

Injection molding systems powered by hydraulically driven actuators have been developed having flow control mechanisms that control the movement of a valve pin over the course of an injection cycle to cause the pin to move upstream and downstream during the course of upstream withdrawal of the pin from the closed gate position to fully open or during the course of downstream closure of the pin from fully open to a gate closed position over the course of an injection cycle in order to control the rate of flow of fluid material through the gate to correspond to a predetermined profile of fluid flow rates for the injection cycle that vary between a zero flow rate at gate closed position, maximum flow rate at fully pin open position and flow rates intermediate zero and maximum when the pin is in certain positions intermediate fully closed and fully open. In such prior systems a sensor can a condition of the fluid material or of the apparatus such as pin position and send a signal indicative of the sensed condition to a program contained in a controller that uses the signal as a variable input to control hydraulic drive fluid feed to the hydraulic actuator and in turn control movement of the valve pin in accordance with the predetermined profile of positions.

SUMMARY OF THE INVENTION

In accordance with the invention there is provided an apparatus for performing an injection molding cycle in an injection molding apparatus comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, a pneumatic valve assembly that controls the rate of delivery of the pressurized gas from the source to and from the gas drive chambers of the pneumatic actuator to controllably drive the actuator and valve pin upstream and downstream, wherein the pneumatic valve assembly comprises a cylinder housing having fluid delivery ports for delivering pressurized gas to and from the gas drive chambers of the actuator, an interior bore defined by an interior wall and a spool having one or more heads and recesses disposed between the heads, the heads having an outside surface integral with the heads that slidably engages with the interior wall of the cylinder housing to form a seal against flow of the pressurized gas between the engaged surfaces, the spool being controllably and translationally drivable within the cylinder housing to selectively open and close the fluid delivery ports a selected degree to control flow of pressurized gas to and from the drive chambers, a controller containing instructions that instruct the pneumatic valve assembly to drive the valve pin either upstream or downstream through selected ones of the intermediate positions at one or more selected reduced velocities that are reduced relative to the one or more maximum velocities.

The outside surfaces of the heads are typically comprised of at least about 90% by weight of a metal material and the interior wall of the bores that is slidably engaged with the outside surfaces of the heads is comprised of at least about 90% by weight of a metal material, the engaged surfaces being metal on metal.

The apparatus typically further comprises a sensor that senses the position of the valve pin or the actuator and sends a signal indicative of the sensed position to the controller, the controller including instructions that instruct the valve assembly to drive the actuator and valve pin upstream or downstream at the one or more maximum velocities upon receipt of a signal from the position sensor that indicates the valve pin or actuator are disposed at one or more predetermined positions along the stroke length.

The controller can include a profile of actuator or valve pin positions versus upstream or downstream velocities for all or a portion of the stroke length, the controller including instructions instructing the valve assembly to drive the actuator or valve pin upstream or downstream at velocities according to the profile in response to receipt of the signal indicative of the sensed position of the actuator or valve pin.

The controller can include instructions that instruct the valve assembly to drive the valve pin to stop at a selected gate closed position, the controller including a program that establishes the sensed gate closed position as the first position of the injection cycle, the controller including instructions that instruct the valve assembly to begin an injection cycle by driving the valve pin to the established first position and stopping the valve pin on sensing of the valve pin at the established first position.

The spool is preferably controllably and translationally drivable within the cylinder without friction generating engagement with another object or external member.

The valve assembly can include a drive member mounted to the spool, the drive member being controllably energizable to cause the spool to controllably slide along a back and forth path of lateral travel, the drive member being translationally movable along the back and forth path of lateral travel together with the spool and being supported during movement solely by mounting to the spool. Most preferably, the spool is controllably and translationally driven within the cylinder without friction generating engagement with another object or external member.

The cylinder of the valve assembly can include at least two gas exhaust ports that exhaust pressurized gas exiting from corresponding ones of the gas drive chambers to a source of ambient gas on selective slidable movement of the spool within the interior bore of the cylinder.

In another aspect of the invention there is provided an apparatus for performing an injection molding cycle comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, a pneumatic valve assembly that controls the rate of delivery of the pressurized gas from the source to and from the gas drive chambers of the pneumatic actuator to controllably drive the actuator and valve pin upstream and downstream, wherein the pneumatic valve assembly comprises a cylinder housing having fluid delivery ports for delivering pressurized gas to and from the gas drive chambers of the actuator and a spool controllably and translationally drivable within the cylinder housing to selectively open and close the fluid delivery ports a selected degree to control flow of pressurized gas to and from the drive chambers, the spool being controllably and translationally drivable within the cylinder without friction generating engagement with another object or external member, a controller containing instructions that instruct the pneumatic valve assembly to drive the valve pin either upstream or downstream through selected ones of the intermediate positions at one or more selected velocities that are reduced relative to the one or more maximum velocities.

In accordance with the invention there is also provided a method of performing an injection molding cycle in an injection molding apparatus comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, the method comprising:

interconnecting the pneumatic actuator to a pneumatic valve assembly that controls the rate of delivery of the pressurized gas from the source to and from the gas drive chambers of the pneumatic actuator, wherein the pneumatic valve assembly comprises a cylinder housing having an interior bore defined by an interior wall and a spool having an axis disposed within the interior bore for slidable movement along the axis of the spool, the spool being controllably slidable within the interior bore to selectable axial positions that controllably deliver the pressurized gas to and from the gas drive chambers, the spool having one or more heads and recesses disposed between the heads, the heads having an outside surface integral with the heads that slidably engage with the interior wall of the cylinder to form a seal against flow of the pressurized gas between the engaged surfaces, controllably driving the actuator with the pneumatic valve assembly to drive the valve pin either upstream or downstream through selected ones of the intermediate positions at one or more selected velocities that are reduced relative to the one or more maximum velocities.

Such a method can further comprise sensing the position of the valve pin or the actuator and driving the actuator and valve pin upstream or downstream at the one or more maximum velocities upon sensing the position of the valve pin or the actuator at one or more predetermined positions along the stroke length.

Such a method can further comprise selecting a profile of actuator or valve pin positions versus upstream or downstream velocities for all or a portion of the stroke length, sensing the position of the actuator or valve pin and driving the actuator or valve pin upstream or downstream at velocities according to the profile in response to the sensed position of the actuator or valve pin.

Such a method can further comprise sensing the position of the valve pin, driving the valve pin to stop at a selected gate closed position, establishing the sensed gate closed position as the first position of the injection cycle, beginning an injection cycle by driving the valve pin to the established first position and stopping the valve pin on sensing of the valve pin at the established first position.

Such a method can further comprise adapting the outside surfaces of the heads to be comprised of at least about 90% by weight of a metal material and adapting the interior wall of the bores that is slidably engaged with the outside surfaces of the heads to be comprised of at least about 90% by weight of a metal material, the engaged surfaces being metal on metal.

Such a method can further comprise adapting the valve assembly to include a drive member mounted to the spool, the drive member being controllably energizable to cause the spool to controllably slide along a back and forth path of lateral travel, the drive member being translationally movable along the back and forth path of lateral travel together with the spool and being supported during movement solely by mounting to the spool.

Such a method can further comprise adapting the cylinder to include at least two gas exhaust ports that exhaust pressurized gas exiting from corresponding ones of the gas drive chambers to a source of ambient gas on selective slidable movement of the spool within the interior bore of the cylinder.

In accordance with the invention there is provided a method of performing an injection molding cycle in an injection molding apparatus comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator at one or more selected maximum rates of travel, the pneumatic actuator comprising a pair of opposing first and second gas drive chambers, the actuator being drivably interconnected to a valve pin drivable upstream and downstream along a path of travel having a selected stroke length that extends between a first position where the valve pin prevents the injection fluid material from flowing into the cavity and another selected maximum flow position at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to position the valve pin at the one or more selectable intermediate positions, a sensor that senses values of a selected physical position or condition of the apparatus or of the injection fluid material during the cycle that are indicative of the rate of flow of the injection fluid material through the gate, the sensor generating a signal corresponding to the sensed values, the method comprising:

preselecting a profile of values that correspond to a preselected series of the one or more intermediate positions of the valve pin, beginning the injection cycle with the valve pin in the first position, using the sensor to sense values of the selected physical position or condition of the apparatus or injection fluid material, using the sensed values during the cycle to controllably drive the pneumatic actuator according to the preselected profile of values to position the valve pin at the preselected series of the one or more intermediate positions during the cycle.

Such a method can further comprise establishing a starting value of a selected physical position or condition of the apparatus or injection fluid material that is indicative of a selected starting position of the valve pin that corresponds to the first position of the valve pin and using the sensor to sense the starting value and driving the actuator to position the valve pin at the selected starting position at the beginning of an injection cycle based on the sensed starting value.

Such a method can further comprise establishing an end of stroke value of a selected physical position or condition of the apparatus or injection fluid material that is indicative of the selected maximum flow position of the valve pin and using the established end of stroke value in the preselected profile to establish the selected stroke length.

Such a method can further comprise preselecting a profile of values that are indicative of positions of the valve pin that remain about the same or that vary between upstream and downstream over one or more selected portions of the injection cycle.

In such a method the selected physical position or condition of the apparatus or injection fluid material can comprise one or more of position of the actuator, position of the valve pin, position of a screw to a barrel that injects fluid to the manifold, position of a pneumatic valve that drives the pneumatic actuator, pressure of the pressurized gas, pressure of the injection fluid material and temperature of the injection fluid material.

The preselected profile of values can be selected to correspond to a series of positions of the valve pin that reduce the flow of injection fluid material to a rate that is less than the maximum rate of flow of fluid material over one or more selected portions of the injection cycle.

The preselected profile of values can be selected to correspond to a series of positions of the valve pin that reduce the flow of injection fluid material to a rate that is less than the maximum rate of flow of fluid material over the entirety of the injection cycle.

The valve pin and the fluid delivery channel are preferably adapted to vary rate of flow of the injection fluid material to rates that are less than the maximum rate when the tip end of the valve pin is disposed in close proximity to the gate or when a selected upstream bulbous portion of the valve pin is disposed in close proximity to a selected complementary throat portion of the delivery channel.

The pneumatic actuator is typically interconnected to a pneumatic valve that controls the rate of delivery of the pressurized gas from the source to and from the gas drive chambers of the pneumatic actuator, the pneumatic valve comprising a cylinder housing having an interior bore defined by an interior wall and a spool slidably disposed within the interior bore, the spool being controllably slidable within the interior bore to controllably deliver the pressurized gas to and from the gas drive chambers, the spool having one or more heads and recesses disposed between the heads, the heads having an outside surface integral with the heads that interfaces with the interior wall of the cylinder to form a seal against flow of the pressurized gas along the interface.

The pneumatic actuator can be interconnected to a pneumatic valve that controls delivery of the pressurized gas from the source to and from the gas drive chambers of the pneumatic actuator, the pneumatic valve comprising a cylinder housing having an interior bore defined by an interior wall and a spool slidably disposed within the interior bore, the spool being controllably slidable within the interior bore to controllably deliver the pressurized gas to and from the gas drive chambers, the cylinder having at least two gas exhaust ports that exhaust pressurized gas exiting from corresponding ones of the gas drive chambers to a source of ambient gas on selective slidable movement of the spool within the interior bore of the cylinder.

The pneumatic actuator can be interconnected to a pneumatic valve assembly that controls delivery of the pressurized gas from the source to and from the gas drive chambers of the pneumatic actuator, the pneumatic valve assembly comprising a spool mounted within a cylinder for slidable back and forth movement within the cylinder and a translationally movable drive member mounted to the spool, the drive member being controllably energizable to controllably slide the spool along a back and forth path of travel, the drive member translationally moving along the back and forth path of lateral travel together with the spool and being supported during movement solely by mounting to the spool.

In another aspect of the invention there is provided an injection molding apparatus for performing an injection cycle using a source of pressurized gas and a pneumatic valve assembly to controllably drive a pneumatically drivable actuator, the apparatus comprising:

a manifold that receives an injection fluid material, the manifold having or communicating with a delivery channel that delivers the injection fluid mold material under an injection pressure to a gate of a mold cavity, a source of pressurized gas having a selected maximum pressure capable of driving the actuator at one or more selected maximum rates of travel, the pneumatic actuator comprising a pair of opposing first and second gas drive chambers, the pneumatic valve assembly including a drive device that is controllably operable to controllably vary delivery of the pressurized gas to and from the gas drive chambers to controllably vary upstream and downstream movement of the pneumatic actuator, the pneumatically drivable actuator being drivably interconnected to a valve pin drivable upstream and downstream along a path of travel having a selected stroke length that extends between a first position where the valve pin prevents the injection fluid material from flowing into the cavity and a selected maximum flow rate position at which the injection fluid material flows at a selected maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum rate position, a sensor that senses values of a selected physical position or condition of the apparatus or of the injection fluid material during the cycle that are indicative of the rate of flow of the injection fluid material through the gate, the sensor generating a signal corresponding to the sensed values, a controller interconnected to the drive device of the pneumatic, the controller including a preselected profile of values of the selected physical position or condition of the apparatus or of the injection fluid material, the controller being interconnected to the sensor and receiving the sensed values, the controller including instructions for comparing the sensed values to the preselected profile of values and automatically directing the drive device of the pneumatic valve assembly, based on the comparison, to adjust positioning of the actuator and the valve pin to positions that adjust rate of flow of the injection fluid material to values that correspond to the preselected profile of values.

In such an apparatus the preselected profile of values are typically selected to correspond to a series of positions of the valve pin that reduce the flow of injection fluid material to a rate that is less than the maximum rate of flow of fluid material over one or more selected portions of the injection cycle.

The preselected profile of values are typically selected to correspond to a series of positions of the valve pin that reduce the flow of injection fluid material to a rate that is less than the maximum rate over the entirety of the injection cycle.

The selected physical position or condition of the apparatus or injection fluid material typically comprises one or more of position of the actuator, position of the valve pin, position of a screw to a barrel that injects fluid to the manifold, position of a pneumatic valve that drives the pneumatic actuator, pressure of the pressurized gas, pressure of the injection fluid material and temperature of the injection fluid material.

In such an apparatus the controller typically includes a selected starting value that corresponds to a selected starting position of the valve pin that corresponds to the first position of the valve pin, the sensor sensing a value of the position of the valve pin at the beginning of a cycle and sending a signal corresponding to the sensed beginning value to the controller, the controller including instructions that compare the sensed beginning value to the selected starting value and direct the drive device of the pneumatic valve assembly to adjust position of the valve pin to a position corresponding to the selected starting position of the valve pin.

In such an apparatus the controller typically includes a preselected end of stroke value, the controller using the preselected end of stroke value as a value corresponding to the maximum flow rate position of the valve pin in the preselected profile of values to establish the selected stroke length of the valve pin.

In such an apparatus the preselected profile of values are typically selected to be indicative of at least a series of positions of the valve pin that remain about the same or that vary between upstream and downstream position over one or more selected portions of the injection cycle.

The valve pin and the fluid delivery channel can be adapted to vary rate of flow of the injection fluid material to rates that are less than the maximum flow rate either when the tip end of the valve pin is disposed in close proximity to the gate over a selected path of travel or when a selected upstream bulbous portion of the valve pin is disposed in close proximity to a selected complementary throat portion of the delivery channel over a selected path of travel.

In such an apparatus the pneumatic valve assembly can comprise: a cylinder housing having an interior bore defined by an interior wall and, a spool slidably disposed within the interior bore, the spool being controllably slidable within the interior bore to controllably deliver the pressurized gas to and from the gas drive chambers, the spool having one or more heads and recesses disposed between the heads, the heads having an outside surface integral with the heads that interfaces with the interior wall of the cylinder to form a seal against flow of the pressurized gas along the interface.

In such an apparatus the pneumatic valve assembly can comprise: a cylinder housing having an interior bore defined by an interior wall and, a spool slidably disposed within the interior bore, the spool being controllably slidable within the interior bore to controllably deliver the pressurized gas to and from the gas drive chambers, the cylinder having at least two gas exhaust ports that exhaust pressurized gas exiting from corresponding ones of the gas drive chambers to a source of ambient gas on selective slidable movement of the spool within the interior bore of the cylinder.

In such an apparatus the pneumatic valve assembly can comprises: a spool mounted within a cylinder for slidable lateral movement within the cylinder and, a translationally movable drive member mounted to the spool, the drive member being controllably energizable to controllably translationally slide the spool along a back and forth path of travel, the drive member translationally moving along the back and forth path of travel together with the spool and being supported during translational movement solely by mounting to the spool.

In another aspect of the invention there is provided a method of performing an injection molding cycle in an injection molding apparatus comprising:

a manifold that receives an injection fluid material, the manifold having or communicating with a delivery channel that delivers the injection fluid mold material under an injection pressure to a gate of a mold cavity, a hydraulic actuator driven by a source of pressurized liquid having a selected maximum pressure capable of driving the actuator at one or more selected maximum rates of travel, the hydraulic actuator comprising a pair of opposing first and second liquid drive chambers, the actuator being drivably interconnected to a valve pin drivable upstream and downstream along a path of travel having a selected stroke length that extends between a first position where the valve pin prevents the injection fluid material from flowing into the cavity and another selected maximum flow position at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the hydraulic actuator being controllably drivable to position the valve pin at the one or more selectable intermediate positions, a sensor that senses values of a selected physical position or condition of the apparatus or of the injection fluid material during the cycle that are indicative of the rate of flow of the injection fluid material through the gate, the sensor generating a signal corresponding to the sensed values, the method comprising:

preselecting a profile of values that correspond to a preselected series of the one or more intermediate positions of the valve pin, beginning the injection cycle with the valve pin in the first position, using the sensor to sense values of the selected physical position or condition of the apparatus or injection fluid material, using the sensed values during the cycle to controllably drive the hydraulic actuator according to the preselected profile of values to position the valve pin at the preselected series of the one or more intermediate positions during the cycle, In such a method the the hydraulic actuator can be interconnected to a hydraulic valve that controls the rate of delivery of the pressurized liquid from the source to and from the liquid drive chambers of the hydraulic actuator, the hydraulic valve comprising a cylinder housing having an interior bore defined by an interior wall and a spool slidably disposed within the interior bore, the spool being controllably slidable within the interior bore to controllably deliver the pressurized liquid to and from the liquid drive chambers, the spool having one or more heads and recesses disposed between the heads, the heads having an outside surface integral with the heads that interfaces with the interior wall of the cylinder to form a seal against flow of the pressurized liquid along the interface.

In such a method the pneumatic actuator is interconnected to a hydraulic valve that controls delivery of the pressurized liquid from the source to and from the liquid drive chambers of the pneumatic actuator, the hydraulic valve can comprise a cylinder housing having an interior bore defined by an interior wall and a spool slidably disposed within the interior bore, the spool being controllably slidable within the interior bore to controllably deliver the pressurized liquid to and from the liquid drive chambers, the cylinder can have at least two liquid exhaust ports that exhaust pressurized liquid exiting from corresponding ones of the liquid drive chambers to a source of ambient liquid on selective slidable movement of the spool within the interior bore of the cylinder.

In such a method the hydraulic actuator is interconnected to a hydraulic valve assembly that controls delivery of the pressurized liquid from the source to and from the gas drive chambers of the hydraulic actuator, the hydraulic valve assembly comprising a spool mounted within a cylinder for slidable back and forth movement within the cylinder and a translationally movable drive member mounted to the spool, the drive member being controllably energizable to controllably slide the spool along a back and forth path of travel, the drive member translationally moving along the back and forth path of lateral travel together with the spool and being supported during movement solely by mounting to the spool.

In another aspect of the invention there is provided an injection molding apparatus for performing an injection cycle using a source of pressurized liquid and a hydraulic valve assembly to controllably drive a hydraulically drivable actuator, the apparatus comprising a manifold that receives an injection fluid material, the manifold having or communicating with a delivery channel that delivers the injection fluid mold material under an injection pressure to a gate of a mold cavity, a source of pressurized liquid having a selected maximum pressure capable of driving the actuator at one or more selected maximum rates of travel, the hydraulic actuator comprising a pair of opposing first and second liquid drive chambers, the hydraulic valve assembly including a drive device that is controllably operable to controllably vary delivery of the pressurized liquid to and from the liquid drive chambers to controllably vary upstream and downstream movement of the hydraulic actuator, the hydraulically drivable actuator being drivably interconnected to a valve pin drivable upstream and downstream along a path of travel having a selected stroke length that extends between a first position where the valve pin prevents the injection fluid material from flowing into the cavity and a selected maximum flow rate position at which the injection fluid material flows at a selected maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum rate position, a sensor that senses values of a selected physical position or condition of the apparatus or of the injection fluid material during the cycle that are indicative of the rate of flow of the injection fluid material through the gate, the sensor generating a signal corresponding to the sensed values, a controller interconnected to the drive device of the hydraulic valve assembly, the controller including a preselected profile of values of the selected physical position or condition of the apparatus or of the injection fluid material, the controller being interconnected to the sensor and receiving the sensed values, the controller including instructions for comparing the sensed values to the preselected profile of values and automatically directing the drive device of the hydraulic valve assembly, based on the comparison, to adjust positioning of the actuator and the valve pin to positions that adjust rate of flow of the injection fluid material to values that correspond to the preselected profile of values.

In such an apparatus the hydraulic valve assembly can comprise a cylinder housing having an interior bore defined by an interior wall and a spool slidably disposed within the interior bore, the spool being controllably slidable within the interior bore to controllably deliver the pressurized liquid to and from the liquid drive chambers, the spool having one or more heads and recesses disposed between the heads, the heads having an outside surface integral with the heads that interfaces with the interior wall of the cylinder to form a seal against flow of the pressurized liquid along the interface.

In such an apparatus, the hydraulic valve assembly can comprise a cylinder housing having an interior bore defined by an interior wall and a spool slidably disposed within the interior bore, the spool being controllably slidable within the interior bore to controllably deliver the pressurized liquid to and from the liquid drive chambers, the cylinder can have at least two liquid exhaust ports that exhaust pressurized liquid exiting from corresponding ones of the liquid drive chambers to a source of ambient liquid on selective slidable movement of the spool within the interior bore of the cylinder.

In such an apparatus, the hydraulic valve assembly can comprise a spool mounted within a cylinder for slidable back and forth movement within the cylinder and a translationally movable drive member mounted to the spool, the drive member being controllably energizable to controllably slide the spool along a back and forth path of travel, the drive member translationally moving along the back and forth path of lateral travel together with the spool and being supported during movement solely by mounting to the spool.

In another aspect of the invention there is provided an apparatus for performing an injection molding cycle comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, a pneumatic valve assembly that controls the rate of delivery of the pressurized gas from the source to and from the gas drive chambers of the pneumatic actuator to controllably drive the actuator and valve pin upstream and downstream, wherein the pneumatic valve assembly comprises a cylinder housing having fluid delivery ports for delivering pressurized gas to and from the gas drive chambers of the actuator, an interior bore defined by an interior wall and a spool having one or more heads and recesses disposed between the heads, the heads having an outside surface integral with the heads that slidably engages with the interior wall of the cylinder housing to form a seal against flow of the pressurized gas between the engaged surfaces, the spool being controllably and translationally drivable within the cylinder housing to selectively open and close the fluid delivery ports a selected degree to control flow of pressurized gas to and from the drive chambers, a controller containing instructions that instruct the pneumatic valve assembly to drive the valve pin either upstream or downstream for one or more preselected periods of time at one or more selected reduced velocities that are reduced relative to the one or more maximum velocities.

In such an apparatus the outside surfaces of the heads are typically comprised of a metal material and the interior wall of the bores that is slidably engaged with the outside surfaces of the heads is comprised of a metal material, the engaged surfaces being metal on metal.

In such an apparatus the spool is preferably controllably and translationally drivable within the cylinder without friction generating engagement with another object.

In such an apparatus the valve assembly preferably includes a drive member mounted to the spool, the drive member being controllably energizable to cause the spool to controllably slide along a back and forth path of lateral travel, the drive member being translationally movable along the back and forth path of lateral travel together with the spool and being supported during movement solely by mounting to the spool.

In such an apparatus the cylinder of the valve assembly preferably includes at least two gas exhaust ports that exhaust pressurized gas exiting from corresponding ones of the gas drive chambers to a source of ambient gas on selective slidable movement of the spool within the interior bore of the cylinder.

In another aspect of the invention there is provided an apparatus for performing an injection molding cycle comprising:

a manifold that receives an injection fluid material, the manifold having or communicating with a delivery channel that delivers the injection fluid mold material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, a pneumatic valve assembly that controls the rate of delivery of the pressurized gas from the source to and from the gas drive chambers of the pneumatic actuator to controllably drive the actuator and valve pin upstream and downstream, wherein the pneumatic valve assembly comprises a cylinder housing having fluid delivery ports for delivering pressurized gas to and from the gas drive chambers of the actuator and a spool controllably and translationally drivable within the cylinder housing to selectively open and close the fluid delivery ports a selected degree to control flow of pressurized gas to and from the drive chambers, the spool being controllably and translationally drivable within the cylinder without friction generating engagement with another object.

a controller containing instructions that instruct the pneumatic valve assembly to drive the valve pin either upstream or downstream through selected ones of the intermediate positions for one or more preselected periods of time at one or more selected velocities that are reduced relative to the one or more maximum velocities.

In another aspect of the invention there is provided a method of performing an injection molding cycle in an injection molding apparatus comprising:

a manifold that receives an injection fluid material, the manifold having or communicating with a delivery channel that delivers the injection fluid material under an injection pressure to a gate of a mold cavity, a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers, the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity, the valve pin and the fluid delivery channel being adapted to vary rate of flow of the injection fluid material to less than the maximum rate when the valve pin is disposed at one or more selectable intermediate positions between the first position and the maximum flow position, the pneumatic actuator being controllably drivable to drive the pin upstream at one or more selectable reduced velocities that are less than the one or more maximum velocities, the method comprising:

interconnecting the pneumatic actuator to a pneumatic valve assembly that controls the rate of delivery of the pressurized gas from the source to and from the gas drive chambers of the pneumatic actuator to controllably drive the actuator and valve pin upstream and downstream, wherein the pneumatic valve assembly comprises a cylinder housing having fluid delivery ports for delivering pressurized gas to and from the gas drive chambers of the actuator, an interior bore defined by an interior wall and a spool having one or more heads and recesses disposed between the heads, the heads having an outside surface integral with the heads that slidably engages with the interior wall of the cylinder housing to form a seal against flow of the pressurized gas between the engaged surfaces, the spool being controllably and translationally drivable within the cylinder housing to selectively open and close the fluid delivery ports a selected degree to control flow of pressurized gas to and from the drive chambers, controllably driving the actuator with the pneumatic valve assembly to drive the valve pin either upstream or downstream through one or more of the intermediate positions for one or more preselected periods of time at one or more selected reduced velocities that are reduced relative to the one or more maximum velocities.

BRIEF DESCRIPTION OF THE DRAWINGS

The above and further advantages of the invention may be better understood by referring to the following description in conjunction with the accompanying drawings in which:

FIGS. 6A-6B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum;

FIGS. 7A-7B show a system having a valve pin that has a cylindrically configured tip end, the tips ends of the pins being positioned at various times and positions between a starting closed position as in FIG. 5A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum;

DETAILED DESCRIPTION

Figure 1:
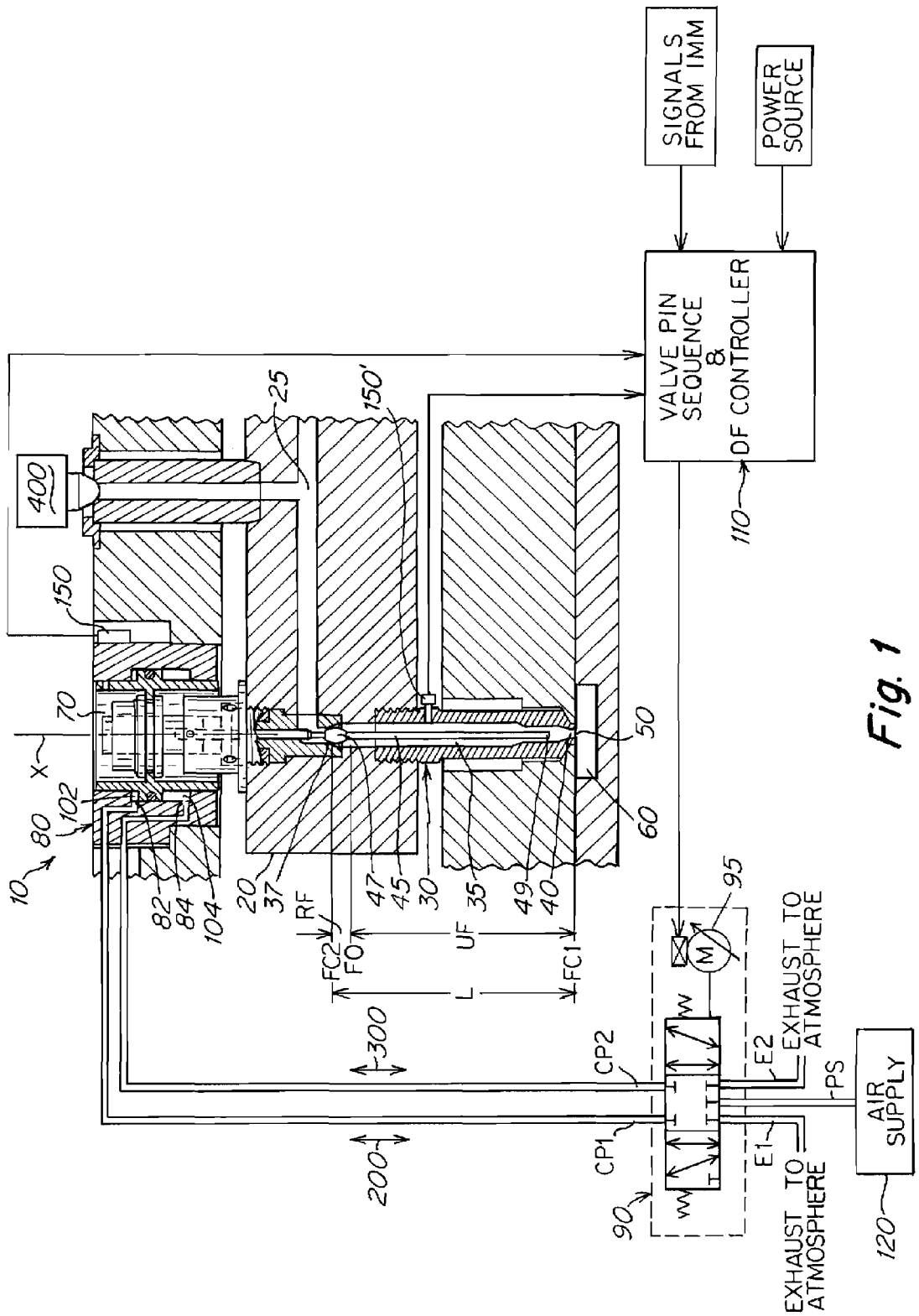
FIG. 1 is a schematic of an embodiment of the invention showing a pneumatically powered system injection molding system comprising a valve pin having an upstream bulbous portion away from the gate controllably driven by a remotely controllable, high precision pneumatic flow control valve interconnected respectively between the flow ports of the upper and lower gas drive chambers of a pneumatic actuator and a master source of pressurized gas, typically air, that drives the system.

FIG. 1 shows a system 10 according to the invention comprised of an actuator 80 that is fluid or gas sealably connected to a fast acting linear force motor proportional valve assembly 90 that can control both the direction of gas flow to the gas drive chambers 102, 104 via respective ports 82, 84 as well as the volume and velocity of gas flow. Pressurized gas is supplied at a maximum pressure from a source 120 to a master pressure source input port PS (the "maximum pressure" being determined by the nature of the source 120 including the composition and temperature of the gas, the size and configuration of the pumps supplying the pressurized gas, the choices of degree of pressure output by the pumps and the like) and depending on the position of the driven valve member of the pneumatic valve assembly 90 (not shown in FIGS. 1, 2, element 700, FIG. 3), pressurized drive gas is routed to and from 200, 300 gas drive chambers 102, 104 of actuator 80 to controllably drive piston 70 and its interconnected valve pin 45 in a back and forth axial direction X along the axis of the fluid delivery channel 35 of nozzle 30 that is mounted in fluid sealed communication with a fluid delivery channel 25 bored within injection fluid distribution manifold 20.

In the FIG. 1 embodiment, the valve pin has a bulbous protrusion 47 that is formed with an outside surface configuration that is complementary to the configuration of a throat section 37 formed on the interior surface of the nozzle passage 35. When the bulbous protrusion 47 is positioned in the center FC2 of the throat section 37 flow of injection fluid through the delivery channel 35 to the gate 50 to cavity 60 is completely stopped or restricted. When the bulbous protrusion is positioned at the fully open position FO, flow of injection fluid occurs at the maximum rate under which injection machine 400 injects fluid into and through manifold 20 channel 25. When the bulbous protrusion 47 is positioned at a position intermediate positions FC and FO, flow of injection fluid through channel 35 to cavity 60 is restricted to a greater or lesser degree or value going progressing from the fully closed FC position to the fully open FO position. Such restriction occurs as a result of interaction of the contoured outer surface of the protrusion 47 with the inside surface of the throat 37 as described in detail in U.S. Pat. No. 6,287,107 with regard to the FIG. 28 embodiment and in U.S. Pat. No. 7,901,601 with regard to the FIGS. 19-21a embodiments, the disclosures of which are incorporated by reference as if fully set forth herein. As described in these patents depending on precisely where the bulbous protrusion is disposed relative to the inside surface of the throat section, the rate of flow of the injection fluid material injected from the manifold channel 25 will be some greater or lesser value or degree relative to the maximum flow rate of the injection fluid material as determined by the injection machine 400. In the FIG. 1 embodiment, a pressure sensor or transducer 150' is disposed immediately downstream of the throat section 37 that the bulb 47 interacts with to reduce the rate of flow of the injection fluid. The pressure sensor sends a signal indicative of injection fluid pressure at the position of the sensor 150' to the controller 110 which uses the signal to control the velocity of movement and axial position of the pin 45 of FIG. 1 which in turn controls the flow rate of the injection fluid through gate 50.

Figure 2:
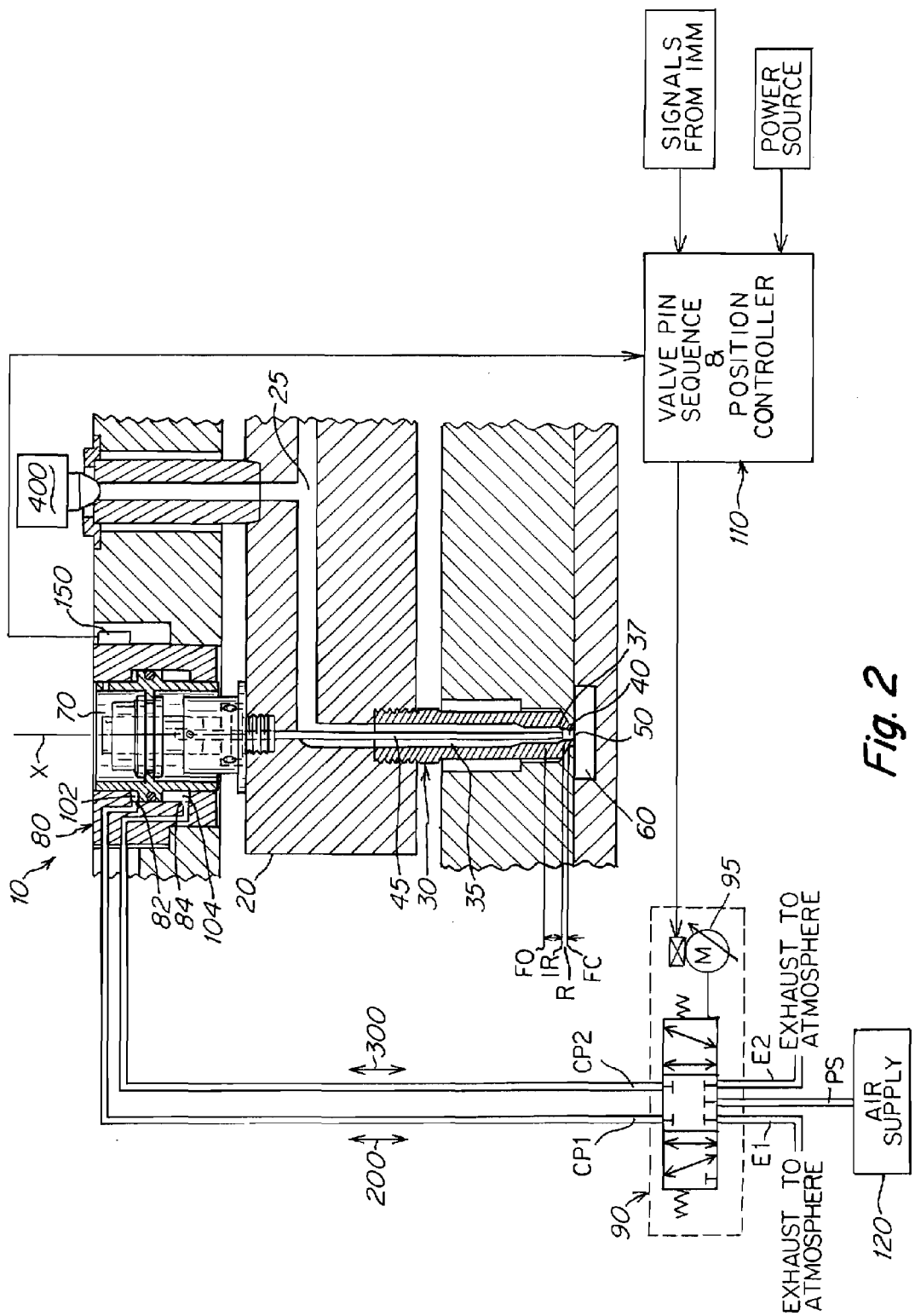
FIG. 2 is a schematic of an embodiment of the invention showing a pneumatically powered system injection molding system comprising a valve pin having distal tip end that is adapted to interact with the interior surface of the gate area of the apparatus to reduce injection fluid material flow to a reduced rate of flow that is less than the maximum rate of flow of the fluid material when the tip end is not in restriction proximity to the gate area, the valve pin being controllably driven by a remotely controllable, high precision pneumatic flow control valve interconnected respectively between the flow ports of the upper and lower gas drive chambers of a pneumatic actuator and a master source of pressurized gas, typically air, that drives the system.

In the FIG. 2 embodiment, flow rate control is effected at the gate via interaction of the distal tip end of the pin 45 with the interior surface of the gate. When the distal tip end 49 of the valve pin 49 is fully disposed within the gate passage 40 of the channel 35, the flow rate of the injection fluid material is stopped by virtue of the outside surface of the tip end 49 mating with the inside surface of the gate passage 40. The pneumatic valve assembly 90, 500 is a high precision, fast acting proportional valve assembly having a valve member that responds or moves essentially instantaneously to energization of the drive device 95, 600, 610 that controls movement of the movable valve member contained within the valve assembly 90, 500. Operation of the drive device 95, 600, 610 is controlled by a master electronic-electric signal generating controller 110 that is interconnected to the drive device 95, 600, 610. The controller 110 includes a processor or microprocessor that can store and execute a program and data for use in the program.

The program contained in the microprocessor can contain instructions that direct the drive device 95, 600, 610 to drive the valve assembly 90, 500 to feed pressurized gas to and from the actuator 80 to position the associated piston 70 and its interconnected valve pin 45 at any preselected desired series of upstream and downstream positions (or at any preselected series of valve pin or actuator velocities) within the channel 35 during the course of an injection cycle. Such a desired series of valve pin positions or velocities can be input into the memory of the controller 110 in the form of a profile of values that are indicative of any one or more of the following parameters all of which correspond to valve pin position and injection fluid material flow rate: position or velocity of the actuator, position or velocity of the valve pin, position or velocity of a screw to a barrel of an injection machine 400 that injects fluid to the manifold channel 25, position of a pneumatic (or hydraulic) valve that drives the pneumatic (or hydraulic) actuator, pressure of the pressurized gas (or liquid), pressure of the injection fluid material and temperature of the injection fluid material.

The preselected profile of values is typically first empirically determined by trial and error cycle runs to determine the best quality part that is produced out of a series of parts that are produced from cavity 60 by running test cycles The profile of values that is determined to produce the best part is input to the memory of the controller 110 and the controller uses the program loaded into the controller to drive the drive device 95 according to the preselected profile of values in the same or similar manner to the manner of operation described with respect to FIGS. 8-11 of U.S. Pat. No. 7,901,601.

As described with reference to FIGS. 8-11 of U.S. Pat. No. 7,901,601, the controller preferably receives a real-time signal feedback from a sensor (such as a position sensor 150 (or in some embodiments a pressure sensor 155) that senses a value of one or more of the above-mentioned parameters and sends a signal indicative of the sensed values of the one or more parameters to the program which then uses the profile of values as a target to direct the drive device 95 to follow by driving the valve assembly 90 to adjust the position of the valve pin 45 to a position that corresponds with the values of the predetermined profile. The drive device 95 adjusts the valve assembly 90 which in turn adjusts the position of the actuator 80 and valve pin 45 which in turn determine the rate of flow of injection fluid material through channel 35 to the cavity 60.

The position sensor 150 (or pressure sensor 150') can also be used to trigger the controller 110 to instruct the valve system 90, 500 to adjust the velocity of travel of the pin 45, 1041 to move at any predetermined velocity when the pin 45 reaches any predetermined position(s) along the course of upstream withdrawal or downstream closure movement of the pin 45, 1041. In such an embodiment the pin 45 is typically instructed to move at a constant velocity beginning from a preselected position and then when the pin reaches a selected position along the stroke length, the sensor 150 detects the pin at the selected position, signals the controller 110 and the controller instructs the pin 45 to move at another different selected velocity. In a typical embodiment using such a protocol, the controller instructs the pin 45 to travel at a preselected reduced velocity beginning from a gate closed position and after travelling upstream to a predetermined upstream position at the selected reduced velocity, the pin 45 is instructed on detection by the sensor 150 to travel at an increased velocity typically maximum velocity. Conversely, the pin 45 can be instructed to travel downstream at a maximum or high velocity beginning from an fully gate open upstream position and subsequently instructed to travel at a reduced downstream velocity less than maximum when the pin on detection by the sensor 150 at a selected downstream position is detected. Alternatively, as discussed above, the velocity of the pin 45, 1041 can be controlled to follow and move according to a predetermined profile of velocities that are determined for essentially every position of the pin along the entire stroke length, the position of the pin being detected by the sensor 150 and constantly input over the entire stroke length or cycle to the controller 110. Where the embodiment of FIG. 1 is used, the pin 45 has two locations for control of injection fluid flow, namely at the throat area 37 and at the gate area 50, it being understood that driving the pin downstream beginning from a throat 37 closed position will increase the injection fluid flow rate. As can also be understood from the FIG. 1 embodiment, the stroke length between fully open and fully closed is different from the cylindrically configured pin 45 embodiment of FIG. 2.

Most preferably the program contained in the microprocessor enables the user to input a value indicative of a predetermined starting position of the valve pin 45 at the beginning of an injection cycle typically a gate closed position where the tip end 1042 is positionable at a very precise axial position relative to the gate 32', 34' of the system. The fast acting valve assembly 90, 500 thus enables the pneumatic actuator 80, 20' to be driven essentially instantaneously at the start point of a cycle to drive the valve pin 45 to the preselected starting valve position.

Typically the preselected profile of values is selected to position the valve pin at a series of positions during the course of a cycle where the valve pin reduces the rate of flow of injection material to less than the maximum rate over at least a portion of the injection cycle, typically over at least about the first 10-50% of the upstream withdrawal portion of the stroke length or over at least about the last 10-50% of the stroke length during the downstream closure portion of an injection cycle.

Preferably, the preselected profile of values is selected to control the position and the velocity of the valve pin 45, 1041 during either the upstream withdrawal or the downstream closure portion of the pin over the course of a full injection cycle.

With regard to the embodiment of FIG. 2, all of same numbered components as in FIG. 1 operate in the same manner as described regarding the FIG. 1 embodiment. The FIG. 2 embodiment differs in structure and operation from the FIG. 1 embodiment in that the valve pin 45 restricts flow of the injection fluid to less than the maximum flow by adjustment of the distance of the outside surface of the tip end 48 of the pin 45 relative to a complementary interior surface 37 of the gate channel 40. Movement of the valve pin 45 to position the tip end 48 between the fully closed FC and the initially restricting IR positions restricts the flow rate of the injection fluid to a greater or lesser degree (less than maximum) depending respectively on the degree of upstream positioning of the tip end 48 relative to the gate channel 40. The outside surface of the tip end 48 interfaces with the inside surface 37 of the nozzle channel 35 to reduce and controllably adjust material flow rate in the same manner as described with reference to FIGS. 3A-4B of PCT/US 2011/062099 the disclosure of which is incorporated by reference as if fully set forth herein.

Figure 3:
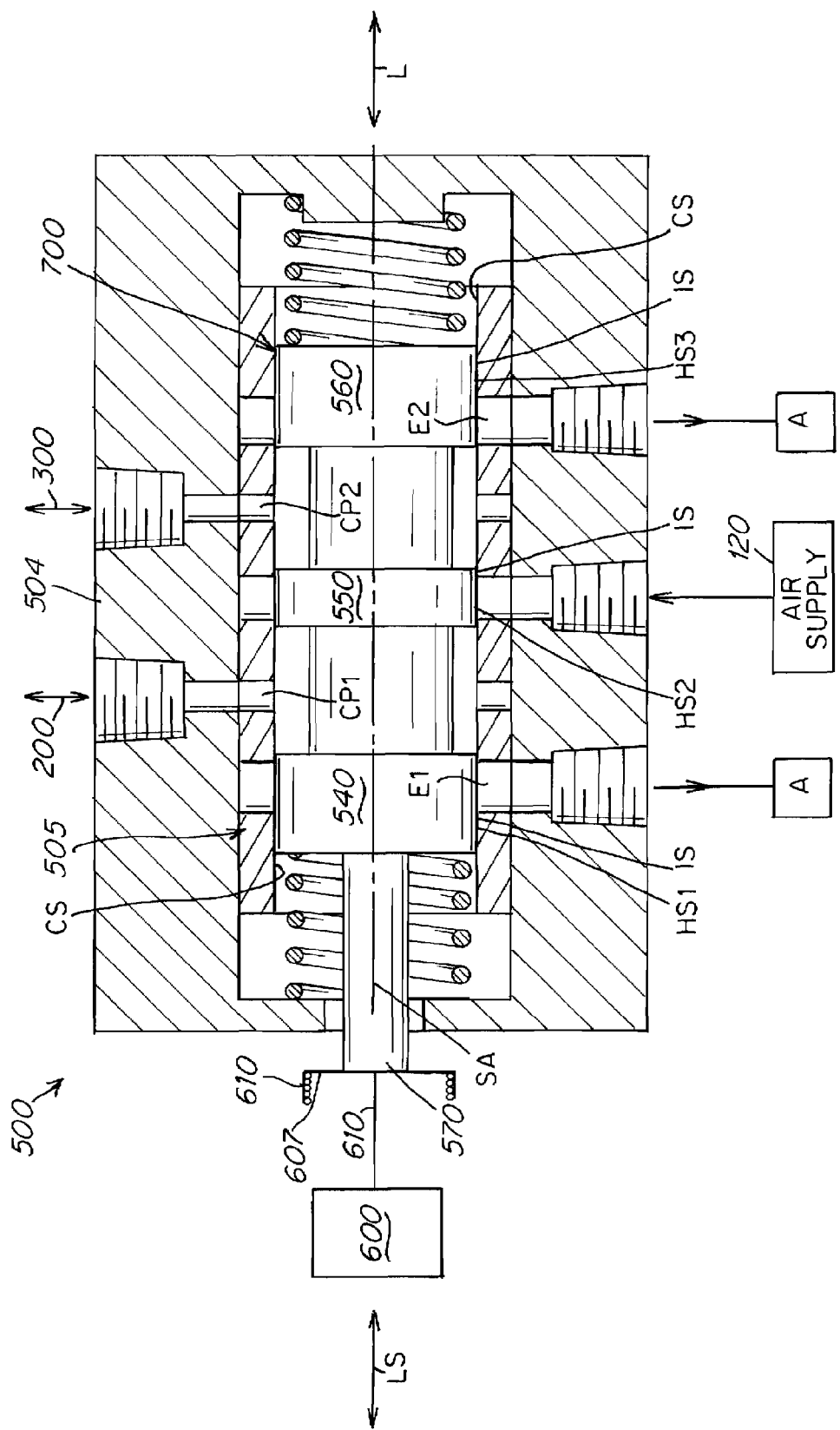
FIG. 3 is a side cross-sectional schematic view of a pneumatic valve assembly that can be used as the high precision pneumatic flow control valve in the FIGS. 1 and 2 injection system embodiments.

FIG. 3 shows one embodiment of a valve assembly 500 that can be used as the valve assembly 90 in the FIGS. 1 and 2 examples described above. In the FIG. 3 the valve assembly 500 includes a spool 700 having heads 540, 550, 560 with respective outer circumferential head surfaces HS1, HS2, HS3. The respective interior interface surfaces CS of the cylinder 505 are machined to close tolerances so as to form a micro gap at the interfaces IS between the head surfaces HS1, HS2, HS3 of each head and the adjacent opposing surface of the interior wall surface CS of the cylinder 505 in the range of 1 to 10 micrometers, thereby avoiding the need for the use of a separate fluid seal, such as a polymeric layer of material, at or between the interfaces IS of such surfaces. Such avoidance of the use of separate fluid seals at the interfaces IS reduces friction at the interfaces and enables the spool 700 to respond more quickly to force that is applied by drive device 600, 610 that drives the spool to travel laterally A on energization of the drive device 610.

The FIG. 3 valve assembly operates in the same manner as the valve assembly shown and described in U.S. Pat. No. 5,960,831 the disclosure of which is incorporated by reference as if fully set forth herein. The spool 700 is driven by an electromagnet 600 and associated pole member that interacts electromagnetically with the coils 610 mounted on the end 570 of the spool to translationally drive the spool A. The spool 700 is drivable laterally and translationally without any friction generating engagement with or interconnection to another object such as would be generated if the spool 700 were interconnected to a movable mechanical object such as the shaft of a motor, or a joint, bushing, screw, bolt, ball bearing, support bearing or other drive device, the spool 700 being slidably supported for driven lateral movement LS within the cylinder 505 solely via engagement of surfaces HS1, HS2 and HS3 with the interior wall surfaces CS of the cylinder 505.

As shown in FIG. 3, the valve assembly 500 comprises a spool valve member 700 comprised of and configured in the form of a distal axial projection 570, heads 540, 550, 560, recesses disposed between the heads and a sealed cylinder 505. The spool valve member 700 is slidably drivable within the interior of the cylinder 505, the interior wall surface CS of the cylinder 505 being formed to have a diameter essentially the same as the outside diameter of the outer circumferential surfaces HS1, HS2, HS3 of the heads 540, 550, 560 respectively. The outside surfaces HS1, HS2, HS3 of the heads 540, 550, 560 are integral with each other such that there is no other material disposed between the heads 540, 550, 560 and the interfaces of surfaces HS1, HS2, HS3 and the interior wall surface CS of the cylinder 505 to form a seal against flow of pressurized gas along or through the interfaces.

The spool valve member 700 is drivable LS laterally back and forth L along its axis SA and depending on the precise lateral position L of the member 700. The precise lateral L position of the heads 540, 550, 560 relative to the flow ports or apertures CP1, CP2 in the cylinder housing 504, 505 determines the direction and degree of flow of pressurized gas back and forth 200, 300 to and from the gas drive chambers 102, 104 of the actuator 80 of FIGS. 1, 2. Further depending on the precise lateral L positioning of the spool valve member 700 pressurized gas will vent or evacuate through one of two vents E1, E2 to an ambient reservoir of gas A such as an ambient atmosphere or a tank of ambient air or other gas.

The spool valve member 700 is driven laterally back and forth LS at predetermined rates and to predetermined lateral positions by the interaction of an electromagnetically energizable coil 610 with a magnetic field generator 600. As shown the coils 610 are fixedly mounted via a bracket 607 on or to the terminal end 570 of spool 700. The coils are typically extend and are mounted circumferentially around spool shaft member 570. The mount 607 is adapted to position the coils 610 to generate a field in a spatial proximity and arrangement relative to the field generated by magnet 600 such that a force is generated by and between the field generated by coil 610 when energized and the field generated by magnet 600 to cause the spool that is fixedly interconnected to coil 610 via mount 607 to be controllably driven LS laterally L as shown in FIG. 3. The coils 610 are interconnected via an electrically conductive wire (not shown) to an external source of power input that is typically included and mounted together with the controller 110 as described herein. An electromagnetic field is controllably generated by the coils 610 by controlled input of electrical energy or power from the remotely interconnected power source. Such electromagnetic interaction between magnetic field generator or magnet 600 and the electromagnetic field generated within coils 610 causes the spool 700 to be controllably laterally L moved LS to precise predetermined lateral positions at predetermined rates via the controller 110, the precise lateral positioning of the heads 540, 550, 560 relative to the flow ports CP1, CP2 in the cylinder housing 504, 505 determining the direction and velocity of drive of the actuator 80, 20' and valve pin 45, 1041.

The spool valve member 700 is preferably mounted on, to and supported within cylinder 505 solely and primarily by mounting engagement or contact between surfaces HS1, HS2, HS3 of the spool member 700 with the complementary interior surfaces CS of cylinder 505. As such, the coils 610 move laterally LS together with movement of the valve member 570, 700 without drag or friction other than the sliding engagement between the outer surfaces HS1, HS2, HS3 and interior cylinder surface CS. In a typical embodiment the drive device 600, 610 comprises an electrically conductive coil 610 mounted on or to projection 570. A permanent magnet and associated pole piece 600 is mounted for generation of a field within or near the axial center of the coil 610 to cause the coil 610 to move laterally when an electric current is applied to the coil 610 in the manner described in the above-referenced U.S. Pat. No. 5,960,831 incorporated by reference herein in its entirety. The mounting and support of the spool 570, 700 solely within and on the valve cylinder 505 reduces the amount of friction or drag that would otherwise be exerted on spool 570, 700 if the spool were mechanically interconnected or mounted to another mechanism such as on bearings or via a universal joint to a rotating motor shaft. Similarly the mounting of the drive device 610 on the projection 570 of spool itself rather than a mechanical interconnection of the spool 570, 700 to a drive device reduces the amount of friction or drag that might otherwise be exerted on the spool 570, 700 by such an interconnection. Most preferably therefore, the operative valve member 700 is mounted for lateral movement between its operative fluid flow positions within cylinder 505 solely by the member's 700 acting as its own bearing for lateral and any other rotational or translational movement between operative positions. The physical interconnection of the coils 610 to the power source via a wire or other power transfer mechanism does not create any significant mechanical drag on, frictional resistance to or engagement with the spool 700 or the driven translational movement of the spool 700 within the cylinder 505.

The preferred pneumatic valve assembly 90 and systems and methods of FIGS. 1, 2 and specific spool pneumatic valve assembly 500 embodiment of FIG. 3 can also be adapted to implement a hydraulic or pressurized liquid system where the supply of pressurized fluid is oil, water or another hydraulic fluid. Such a hydraulic valve assembly 90, 500 can be used in conjunction with a hydraulic actuator having liquid drive chambers analogous to gas drive chambers 102, 104 to construct and use the systems and methods described above in the same manner as described regarding pneumatic systems. The manifold 20, injection machine 400, nozzle 30, valve pin 45, cavity 60 and all other system components and configurations described above can all be used in a hydraulic system using the fast acting spool valve assemblies 90, 500 in the same manner as described above.

The valves 90, 500 can be controllably operated to control the velocity of movement of the pins 45, 1040, 1041 referenced herein during the course of both an upstream travel portion of the injection cycle from fully closed to fully open and a downstream travel portion of the injection cycle from fully open to fully closed. Most preferably the valves 90, 500 are operated to control movement of the pins along a continuous upstream course of travel from fully closed to fully open without movement in a downstream direction during the course of travel. Or the valves 90, 500 are operated to control movement of the pins along a continuous downstream course of travel from fully open to fully closed without movement in an upstream direction during the course of travel.

Figure 4:
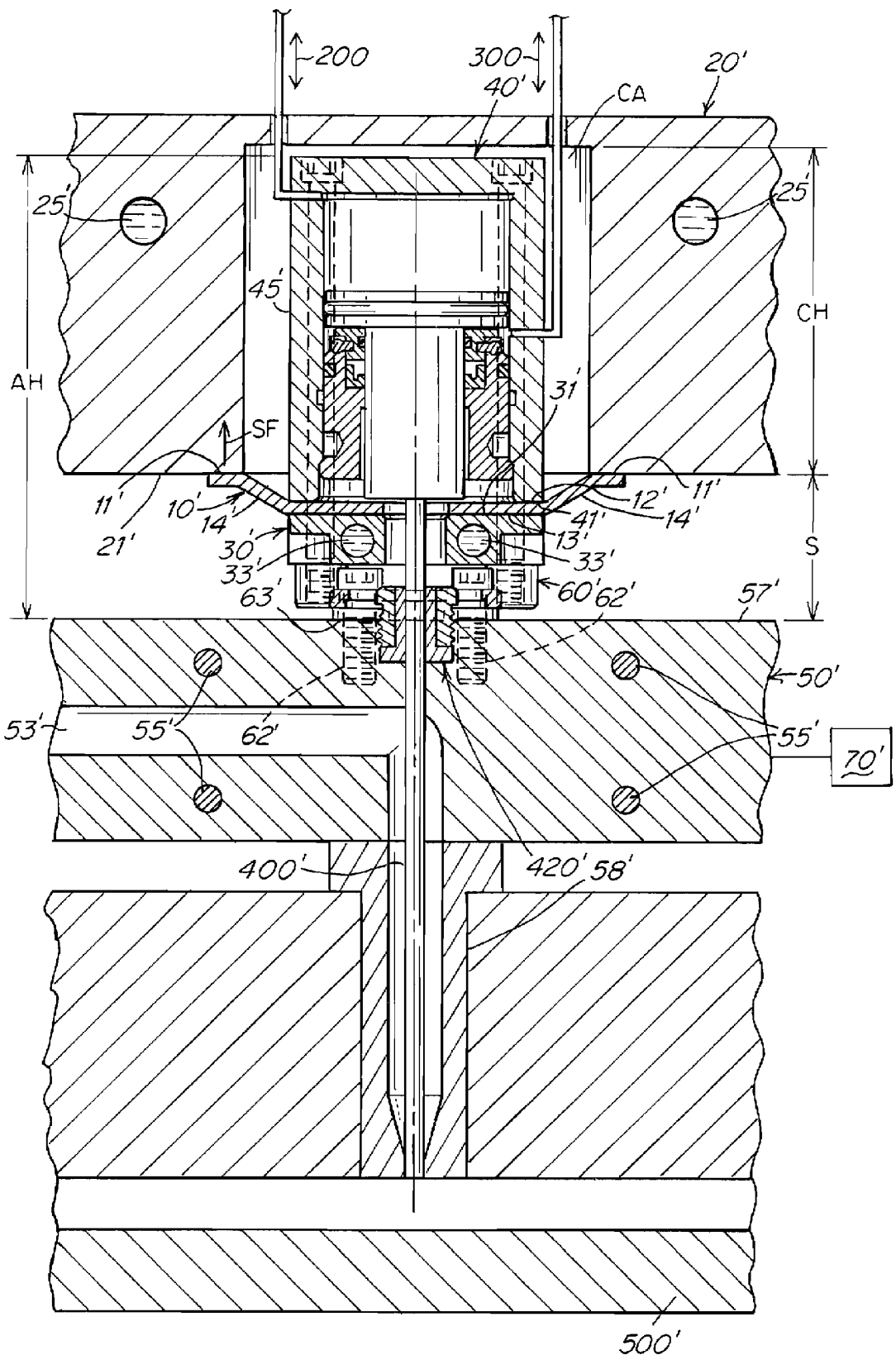
FIG. 4 is a side cross-sectional view of an example of a pneumatic actuator and valve pin assembly in an injection molding system for use together with a pneumatic valve assembly according to the invention.

FIG. 4 illustrates a typical configuration for a pneumatic actuator 40', valve pin 400', actuator mount 10', 30', 60', nozzle 58' et al. assembly that can be used in conjunction with the pneumatic valve assembly described above. In the embodiment shown in FIG. 4, a bottom surface 41' of the body 45' of the actuator 40' is mounted in thermally conductive contact with a top surface 12' of the highly thermally conductive cooling or mounting plate 10'. The bottom or downstream surface 13' of the cooling or mount plate 10' is in turn mounted in compressed contact with the top or upstream facing surface 31' of highly thermally conductive metal cooling block 30.' The cooling block 30' is proactively cooled with water pumped through cooling channels 33' during active operation of the entire apparatus. As shown the cooling block is mounted on a mount 60' the bottom surfaces 63' of which are mounted in direct contact with the top surface 57' of the heated hotrunner 50'. During operation of the apparatus, the cooled cooling block 30' serves to maintain the actuator 40' cool and/or relatively insulated from the heated manifold 50'. In the embodiment shown in the Figures, the cooling block 30' is mounted on the intermediate mount 60' which itself is mounted in engagement contact with the body or top surface 57' of the heated manifold 50' via bolts 62'. Heat from the heated manifold 50' is thus thermally conducted or transferred through the bolts 62' and through the mount 60', block 30' and mount 10' to the actuator 40'.

As shown in FIG. 4, the highly thermally conductive cooling mount 10' has lateral extensions or wings 14' that are configured and arranged to have an upper or upstream facing surface(s) 11' that make compressed contact with a lower surface 21' of the cooled clamp plate 20' thus enabling heat that may otherwise flow from the manifold 50' to/through the cooling block 30' and the plate 10' and the actuator 40' to be conductively transferred to the cooled clamp plate 20'. Once the actuator 40' together with winged cooling plate 10' and in the position shown in FIG. 4 on cooling device 30' and mount 60' onto surface 57', the rest of the system is assembled and arranged such that the clamp plate 20' is mounted a spaced distance S upstream of the heated manifold 50'. The actuator 40' and its associated components plate 30' and mount 60' collectively have a mounting height AH extending upstream from the surface 57' of the heated manifold 50'. The receiving cavity CH of the clamp plate 20 has a receiving depth CH of sufficient size together with space S to accommodate receipt of the mounting height AH of the assembly of the actuator 40', plates 100', and cooling device 30'

Thus in the FIG. 4 embodiment, some portion of the heat that is conducted to the body of the actuator 40' from the heated manifold 50' is re-routed or conducted to the wings 14' via heat conductive engagement of the surfaces 13' and 31'. Such heat that is conducted to the wings 14' is in turn conducted to the clamp plate surface 21' via engagement with the spring-loaded heat conductive surface 11', the clamp plate 20' acting as a heat sink to help lower the temperature of the body 45' of the actuator 40'.

The FIG. 4 system is adapted and arranged so that when assembled, the clamp plate 20' is thermally isolated from the heated manifold by an insulating air space S' by which the clamp plate 20' is spaced apart from the upstream surface 57' of the manifold 50'. Typically, the clamp plate 20' is maintained in such a thermally isolated position relative to the manifold 50', the clamp plate having little to no direct thermally conductive contact with the manifold 50' other than incidentally through a less than about 2 inch square area of contact that may exist between a spacer and the clamp plate 20' and between the spacer and the manifold 50', the spacer being disposed between the clamp plate 20' and the manifold for purposes of ensuring proper positioning of the manifold 50' relative to the clamp plate 20'. The clamp plate 20' is typically cooled with a cooling fluid pumped and flowing through cooling channels 25' in the body of the clamp plate 20'. Thus, thermally conductive direct contact between the surfaces 11' and the clamp plate surface 21' enable heat to transfer from the body 45' of the actuator 40' to the clamp plate 20', the heat being readily dissipated by the cooled clamp plate 20'.

The winged cooling plate 10' is comprised of a highly thermally conductive material. The cooling plate assembly 10', 30', 60' has an assembled height when mounted to the manifold surface 57' that extends from the downstream-most mounting surface 63' of the mount 60' to the upstream facing engagement surface 11 of the wings 14' of the cooling plate 10', FIG. 4. The length of the spacing distance S is predetermined relative to the assembled height such that when the components of the system including the clamp plate 20' and manifold 50' are assembled and connected together with the mold 500', the upstream facing surfaces 11' of the wings 14' engage the downstream facing surface 21' of the clamp plate 20' under a selected amount of compression created by the downstream bending of wings 14' resulting in upward spring force SF being exerted by wings 14' urging surfaces 11' in an upstream direction into compressed engagement with surface 21' of cooled clamp plate 20'. Thus the system is adapted to have an assembled configuration where on assembly together of the clamp plate 20', mold 500', manifold 50', actuator 40' and mount 10', the spring force in the wings 14' is loaded thus urging the surfaces 11' into thermally conductive compressed engagement with the surface 21'.

The compressed contact between thermally conductive metal surfaces 11' and 21' enables heat flow between the bodies 10', 20' having the metal surfaces. The cooling device 30' is typically cooled to less than about 100 degrees Fahrenheit and is actively cooled by water injection flow during an injection cycle. When the injection molding machine 70' is shut down, all of the other components of the apparatus including the cooling device are also typically shut down causing the actuator 40' to be more prone and subject to being heated up by the manifold 50'. The manifold 50' is very large in size and mass and thus takes a longer time to cool down on shutting the apparatus down. Thus immediately after shut down of the apparatus, the cooling block 30' is not proactively working to maintain the actuator 40' cool while the manifold 50' simultaneously remains at a very high temperature thus causing elevated heat transfer from the manifold 50' through the mount 60' and the block 30' to the actuator 40'. The thermally conductive plate-mount 10' serves to divert the manifold heat via the wings 14' to the relatively cool clamp plate 20' which is itself a very large mass of material which is not easily heated up by the hot manifold on shut down. The thermally conductive mount 10' thus essentially cools the actuator 40' or at least works to minimize or lessen the amount of heat transfer from the manifold 50' to the actuator 40' without active cooling by the cooling device 30'.

The use of the valve assembly and methods as described herein are useful and applicable to any injection molding system that employs a valve pin whether the system employs a single valve or nozzle or whether the system includes multiple nozzles and cavities. For purposes of explanation only, one example of an apparatus in which reduced velocity control of a valve pin using a valve system as described above can be used is a system as shown in FIGS. 5A-5E, a cascade process system, where injection is effected in a sequence from the center nozzle 22" first and at a later predetermined time from a lateral nozzle 24". As shown in FIG. 1A the injection cycle is started by first opening the pin 1040 of the center nozzle 22" and allowing the fluid material 100" (typically polymer or plastic material) to flow up to a position the cavity just before 100b the distally disposed entrance into the cavity of the gate 34" of the lateral nozzle 24'. After an injection cycle is begun, the gate of the center injection nozzle 22" and pin 1040 is typically left open only for so long as to allow the fluid material 100b to travel to a position just past 100p the positions 34". Once the fluid material has travelled just past 100p the lateral gate positions 34" the center gate 32" of the center nozzle 22" is typically closed by pin 1040 as shown in FIGS. 5B, 5C, 5D and 5E. The lateral gates 34" is then opened by upstream withdrawal of lateral nozzle pins 1041, 1042 as shown in FIGS. 5B-5E. As described below, the rate of upstream withdrawal or travel velocity of lateral pins 1041, 1042 is controlled as described below.

In alternative embodiments, the center gate 32" and its associated actuator and valve pin 1040 can remain open at, during and subsequent to the times that the lateral gates 34" is opened such that fluid material flows into cavity 30 through both the center gate 32" and the lateral gate 34" simultaneously.

When the lateral gate 34" is opened and fluid material NM is allowed to first enter the mold cavity into the stream 102p that has been injected from center nozzle 22" past gate 34" the two streams NM and 102p mix with each other. If the velocity of the fluid material NM is too high, such as often occurs when the flow velocity of injection fluid material through gate 34" is at maximum, a visible line or defect in the mixing of the two streams 102p and NM will appear in the final cooled molded product at the areas where gate 34" inject into the mold cavity. By injecting NM at a reduced flow rate for a relatively short period of time at the beginning when the gate 34" is first opened and following the time when NM first enters the flow stream 102p, the appearance of a visible line or defect in the final molded product can be reduced or eliminated.

The rate or velocity of upstream withdrawal of pins 1041, 1042 starting from the closed position is controlled via controller 110, FIGS. 1, 2 which controls the rate and direction of flow of hydraulic fluid from the drive system 90, 500 to the actuator 40', 90 associated with the valve pin 1041.

A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

The user programs controller 110 via data inputs on a user interface to instruct the pneumatic system 90, 500 to drive pins 1041, 1042 at an upstream velocity of travel that is reduced relative to a maximum velocity that the pneumatic system can drive the pins 1041, 1042 to travel. As described below, such reduced pin withdrawal rate or velocity is executed until a position sensor such as 150 detects that an actuator 80, 40' or an associated valve pin (or another component), has reached a certain position such as the end point COP, COP2, FIGS. 6B, 7B of a restricted flow path RP, RP2. A typical amount of time over which the pins are withdrawn at a reduced velocity is between about 0.01 and 0.10 second, the entire injection cycle time typically being between about 0.3 seconds and about 3 seconds, more typically between about 0.5 seconds and about 1.5 seconds.

FIGS. 1, 2 shows position sensor 150 sensing the position of the actuator 80, 40' pistons and their associated valve pins (such as 45, 1041, 1042) and feed such position information to controller 110 for monitoring purposes. As shown, fluid material is injected from an injection machine 400 into a manifold runner 25 and further downstream into the fluid flow bores of the nozzles 30, 24", 22" and ultimately downstream through the gates 32", 34", 50. When the pins 45, 1041, 1042 are withdrawn upstream to a position where the tip end of the pins 1041 are in a fully upstream open position such as shown in FIG. 5D, the rate of flow of fluid material through the gates 32", 34" is at a maximum.

However when the pins 45, 1041, 1042 are initially withdrawn beginning from the closed gate position, FIG. 6A, 7A, to intermediate upstream positions, FIGS. 6B, 7B, a gap 1154, 1156 that restricts the velocity of fluid material flow is formed between the outer surfaces 1155 of the tip ends 1142 of the pins and the inner surfaces 1254, 1256 of the gate areas of the nozzles 22''', 24'''. The restricted flow gap 1154, 1156 remains small enough to restrict and reduce the rate of flow of fluid material 1153 through gates 32'', 34'' to a rate that is less than maximum flow velocity over a travel distance RP of the tip end of the pins 1041, 1042 travelling from closed to upstream as shown in FIGS. 6A, 6B, 7A, 7B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 6B, 7B, the pins 45, 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. In such an embodiment, the control system or controller 110 is preprogrammed to control the sequence and the rates of valve pin 45, 1040, 1041 opening and closing. The controller 110 controls the rate of travel, namely velocity of upstream travel, of a valve pin 45, 1041, 1042 from its gate closed position, FIGS. 6A, 7A for at least the predetermined amount of time that is selected to withdraw the pin at the selected reduced velocity rate.

The velocity of withdrawal of the valve pins 45, 1041, 1042 is determined by regulation of the flow of pneumatic drive fluid that is pumped from the supply 120 to the actuators 80, 20' through control valve 90, 500, FIGS. 1, 2, 3. When the valve 90, 500 is completely open, namely 100% open, allowing maximum flow of the pressurized fluid to the actuator cylinders, the valve pins 1041, 1042 are driven at a maximum upstream travel velocity. According to the invention, the degree of openness of the flow restrictor valve is adjusted in response to sensing of position of a suitable component such as the piston component of an actuator 80, 20' or associated valve pin to less than 100% open. Adjustment of the flow restrictor valve 90, 500 to less than 100% open over the course of travel RP, RP2, RP3 at the beginning of an injection cycle thus reduces the rate and volume flow of pressurized hydraulic fluid to the actuator cylinders thus in turn reducing the velocity of upstream travel of a pin 45, 1040, 1041 for the selected period of time. At the end of the travel or length of path RP, RP2, a position sensor 150 (or 100, 130a, 130aa, FIGS. 9A-9D) signals the controller 110, the controller 110 determines that the end COP, COP2 has been reached and the valve 90, 500 is opened to enable a higher pin velocity, typically to its 100% open position to allow the actuator pistons 80, 20' and their associated valve pins 45, 1041 to be driven at maximum upstream velocity FOV in order to reduce the cycle time of the injection cycle.

In alternative embodiments, the user can forego the use of a position or other sensor, instead programming the controller 150 to instruct the spool member 700 to travel L along its axis SA, FIG. 3, at and for one or more preselected periods of times (typically empirically determined) at one or more predetermined reduced upstream or downstream rates or velocities of travel.

Preferably a position or other suitable sensor (pressure, temperature) is used to sense and generate a signal indicative of the position or other property of the apparatus or the injection fluid, the signal being sent to the controller 110. The controller uses the received signal in a set of instructions to instruct valve assembly 90, 500 to operate.

In the case of the FIG. 3 valve assembly embodiment, the controller 110 instructs a power source to input a selected degree of electrical energy or power (voltage or current) into coil 610 to generate field which interacts with a field generated by magnet and pole 600, the interaction of fields causing coil 610 which is mounted to spool member 570 to drive LS valve spool member 700 laterally L to predetermined positions between fully gas flow closed and 100% gas flow open which in turn controllably drives the upstream and downstream movement of the pin 45, 1041 at preselected velocities between zero and maximum velocity. The user inputs such selections into the controller 110.

The user also selects the length of the path of travel RP, RP2 of the valve pin or the position of the valve pin or other component over the course of travel of which the valve 500 is to be maintained partially open and inputs such selections into the controller 110. The controller 110 includes conventional programming or circuitry that receives and executes the user inputs. The controller 110 may include programming or circuitry that enables the user to input as a variable a selected pin velocity rather than a degree or quantum of electrical energy that is sent to the coils that are interconnected to member 570, the programming of the controller 110 automatically converting the inputs by the user to appropriate instructions for the degree of energy output to the electro-mechanism 610 that are mounted to member 570 that are driven by the magnet drive device 600.

Typically the user selects one or more reduced velocities that are less than about 90% of the maximum velocity (namely velocity when the valve 90, 500 is in a maximum drive position), more typically less than about 75% of the maximum velocity and even more typically less than about 50% of the maximum velocity at which the pin 45, 1040, 1041 is drivable by the pneumatic system. The actual maximum velocity at which the actuators 80, 20' and their associated pins 45, 1041 are driven is predetermined by selection of the size and configuration of the actuators 80, 20', the size and configuration of the drive valve 90, 500 and the degree of pressurization and type of gas selected for use by the user. The maximum drive rate of the pneumatic system is predetermined by the manufacturer and the user of the system and is typically selected according to the application, size and nature of the mold and the injection molded part to be fabricated.

As shown by the series of examples of programs illustrated in FIGS. 8A-8D one or more reduced pin velocities can be selected and the pin 45, 1041 driven by restricted pneumatic fluid flow between the gate closed (X and Y axis zero position) and the final intermediate upstream open gate position (4 mm for example in the FIG. 8A example, 5 mm in the FIG. 8B example) at which point the controller 110 in response to position sensing instructs the drive system to drive pin 45, 1040 to travel upstream at a higher, typically maximum, upstream travel velocity (as shown, 100 mm/sec in the FIGS. 8A-8D examples). In the FIG. 8A example, the reduced pin velocity is selected as 50 mm/sec. In practice the actual velocity of the pin may or may not be precisely known, the Y velocity axis corresponding (and generally being proportional) to the degree of electrical energy input to the drive that controls movement of the valve 90, 500, 100 mm/sec corresponding to the valve 90, 500 being in a completely 100% open position (and pin being driven at maximum velocity); and 50 mm/sec corresponding to an electrical energy input to the electromechanism 610 that drives the spool 700 laterally L to a position where pneumatic drive flow is one-half of its maximum 100% degree of flow. In the FIG. 8A example, the path length RP over which the valve pin 45, 1040, 1041 travels at the reduced 50 mm/sec velocity is 4 mm. After the pin 45, 1040, 1041 has been driven to the upstream position COP position of about 4 mm from the gate closed GC position, the controller 110 instructs the electro-mechanism 600, 610 that drives the spool 700 to move the spool 700 to a position where the flow of pneumatic fluid to the actuator 80, 20' is a full 100% flow open at which time the pin 45, 1041 (and its associated actuator piston 80, 20') are driven at the maximum travel rate 100 mm/sec for the predetermined, given pressurized pneumatic system.

Figure 8A:
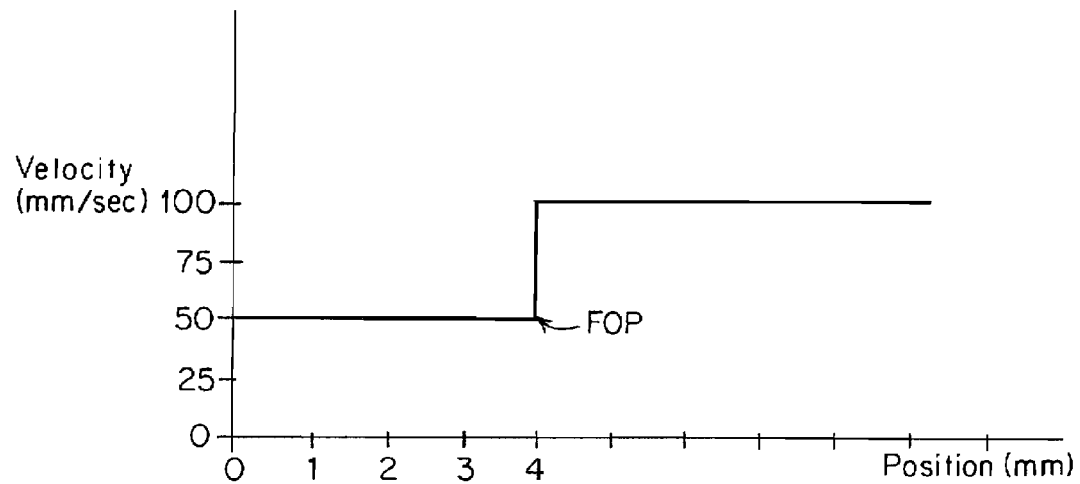
FIGS. 8A-8D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.
Figure 8B:
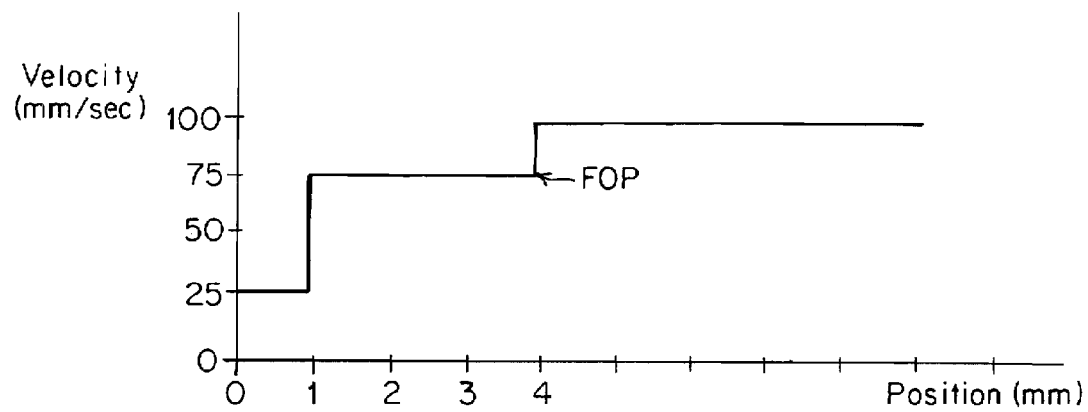
Figure 8C:
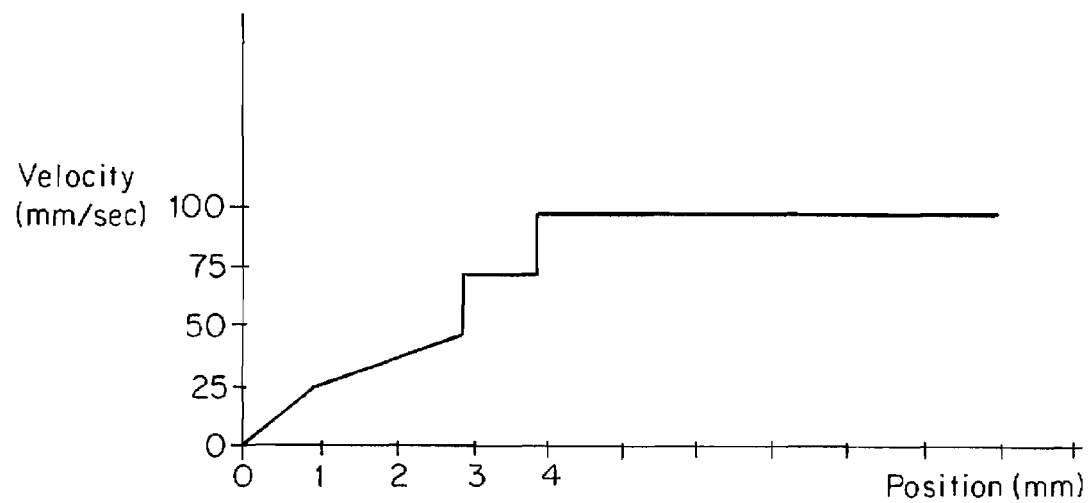
Figure 8D:
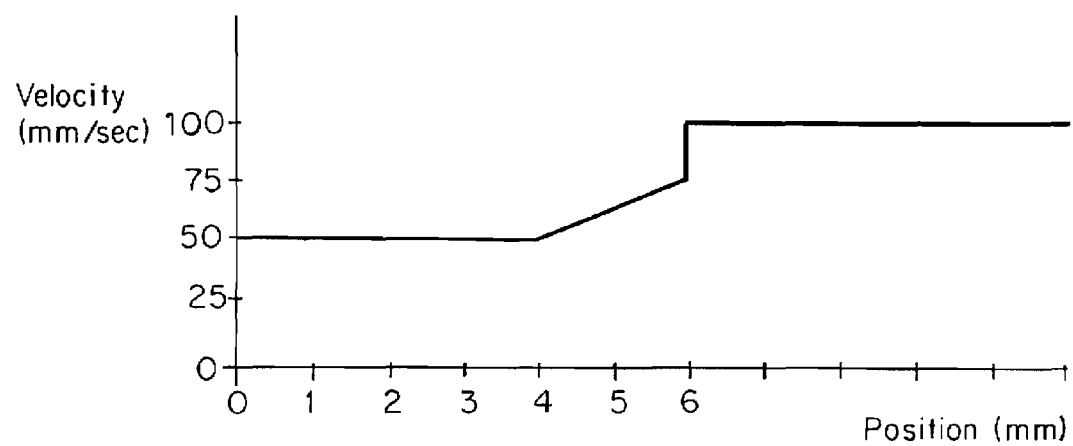

FIGS. 8B-8D illustrate a variety of alternative examples for driving the pin 1041, 1042 at reduced velocities for various durations of time over the course of an injection cycle. For example as shown in FIG. 8B, the pin is driven for 0.02 seconds at 25 mm/sec, then for 0.06 seconds at 75 mm/sec and then allowed to go to full valve open velocity shown as 100 mm/sec. Full valve open or maximum velocity is typically determined by the nature of the pneumatic (or hydraulic) valve or motor drive system that drives the valve pin. In the case of a fluid driven system the maximum velocity that the system is capable of implementing is determined by the nature, design and size of the pumps, the fluid delivery channels, the actuator, the drive fluid (gas or liquid), the restrictor valves and the like.

As shown in FIGS. 8A-8D, when the pin reaches the end of the reduced velocity period, the valve 600 can be instructed to assume the full open position essentially instantaneously or alternatively can be instructed to take a more gradual approach up, between 0.08 and 0.12 seconds, to the maximum valve openness as shown in FIG. 8D. In all cases the controller 110 instructs the valve pin 45, 1040, 1041 to travel continuously upstream rather than follow a profile where the pin might travel in a downstream direction during the course of the injection cycle. By continuously upstream, it is meant that the pin travels upstream or is in a stationary position during the entire course of the upstream portion of the injection cycle without moving downstream during the course of the upstream portion of the injection cycle. By continuously downstream, it is meant that the pin travels downstream or is in a stationary position during the entire course of the downstream portion of the injection cycle without moving upstram during the course of the downstream portion of the injection cycle.

Most preferably, the actuator, valve pin, valves and fluid drive system are adapted to move the valve pin between a gate closed position and a maximum upstream travel position that defines an end of stroke upstream position for the actuator and the valve pin. Most preferably the valve pin is moved at the maximum velocity at one or more times or positions over the course of the upstream portion of the injection cycle once the tip end of the valve pin has reached the upstream gate open position. Alternatively to the pneumatic system depicted and described, a hydraulic or liquid driven system can be used and implemented in the same manner as described above for a pneumatic system.

Preferably, the valve pin 45 and the gate are configured or adapted to cooperate with each other to restrict and vary the rate of flow of fluid material 1153, FIGS. 6A-6B, 7A-7B over the course of travel of the tip end of the valve pin 45, 1041 through the restricted velocity path RP. As shown in FIGS. 6A, 6B the radial tip end surface 1155 of the end 1142 of pin 1041, 1042 can be conical or tapered and the surface of the gate 1254 with which pin surface 1155 is intended to mate to close the gate 34 is complementary in conical or taper configuration. Alternatively as shown in FIGS. 7A, 7B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 8A-8C).

In one embodiment, as the tip end 1142 of the pin 1041 continues to travel upstream from the gate closed GC position (as shown for example in FIGS. 6A, 7A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 8A-8D, where the pin is no longer restricting flow of injection mold material through the gate. In such an embodiment, at the expiration of the predetermined amount of time when the pin tip 1142 reaches the FOP (full open) position FIGS. 8A, 8B, the pin 1041 is immediately driven by the valve system 90 at maximum velocity FOV (full open velocity) typically such that the valve 90, 500 is opened to full 100% open.

In alternative embodiments, when the predetermined time for driving the pin at reduced velocity has expired and the tip 1142 has reached the end of restricted flow path RP2, the tip 1142 may not necessarily be in a position where the fluid flow 1153 is not still being restricted. In such alternative embodiments, the fluid flow 1153 can still be restricted to less than maximum flow when the pin has reached the changeover position COP2 where the pin 1041 is driven at a higher, typically maximum, upstream velocity FOV. In the alternative examples shown in the FIGS. 6B, 7B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 6B the maximum fluid flow rate for injection material 1153 is reached at the upstream position COP of the tip end 1142. In another example shown in FIG. 6B 7B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 8A, 8B examples, the upstream FOP position is about 4 mm and 5 mm respectively upstream from the gate closed position. Other alternative upstream FOP positions are shown in FIGS. 8C, 8D.

In another alternative embodiment, shown in FIG. 7B, the pin 1041 can be driven and instructed to be driven at reduced or less than maximum velocity over a longer path length RP3 having an upstream portion UR where the flow of injection fluid mold material is not restricted but flows at a maximum rate through the gate 34" for the given injection mold system. In this FIG. 7B example the velocity or drive rate of the pin 1041 is not changed over until the tip end of the pin 1041 or actuator 941 has reached the changeover position COP3. As in other embodiments, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at reduced or less than maximum velocity throughout the entirety of the travel path of the pin during an injection cycle from the gate closed position GC up to the end-of-stroke EOS position, the controller 110 being programmed to instruct the drive system for the actuator to be driven at one or more reduced velocities for the time or path length of an entire closed GC to fully open EOS cycle.

In the FIGS. 8A-8D examples, FOV is 100 mm/sec. Typically, when the time period for driving the pin 1041 at reduced velocity has expired and the pin tip 1142 has reached the position COP, COP2, the valve 90, 500 is opened to full 100% open velocity FOV position such that the pins 1041, 1042 are driven at the maximum velocity or rate of travel that the hydraulic system is capable of driving the actuators 80, 20'. Alternatively, the pins 1041, 1042 can be driven at a preselected FOV velocity that is less than the maximum velocity at which the pin is capable of being driven when the valve 90, 500 is fully open but is still greater than the selected reduced velocities that the pin is driven over the course of the RP, RP2 path to the COP, COP2 position.

At the expiration of the predetermined reduced velocity drive time, the pin 45, 1041 is typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 45, 1041 ranges from about 8 mm to about 18 inches upstream from the closed gate position GC.

The controller 110 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

Figure 9A:
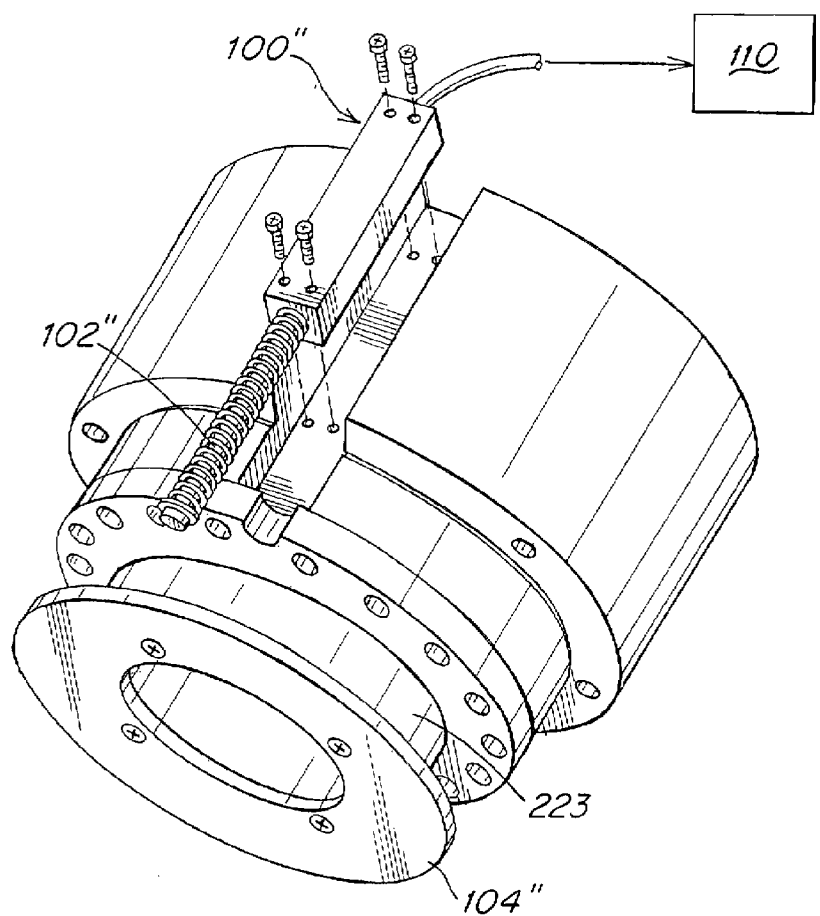
FIGS. 9A-9B show various embodiments of position sensors that can be used in a variety of specific implementations of the invention, the sensors shown in these figures being mounted so as to measure the position of the piston component of the actuator which is indicative of the position of the valve pin relative to the gate.
Figure 9B:
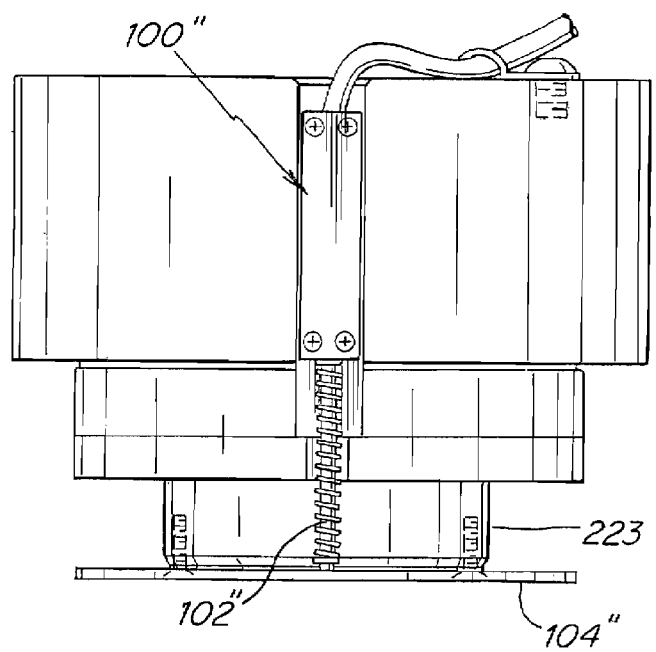
Figure 9C:
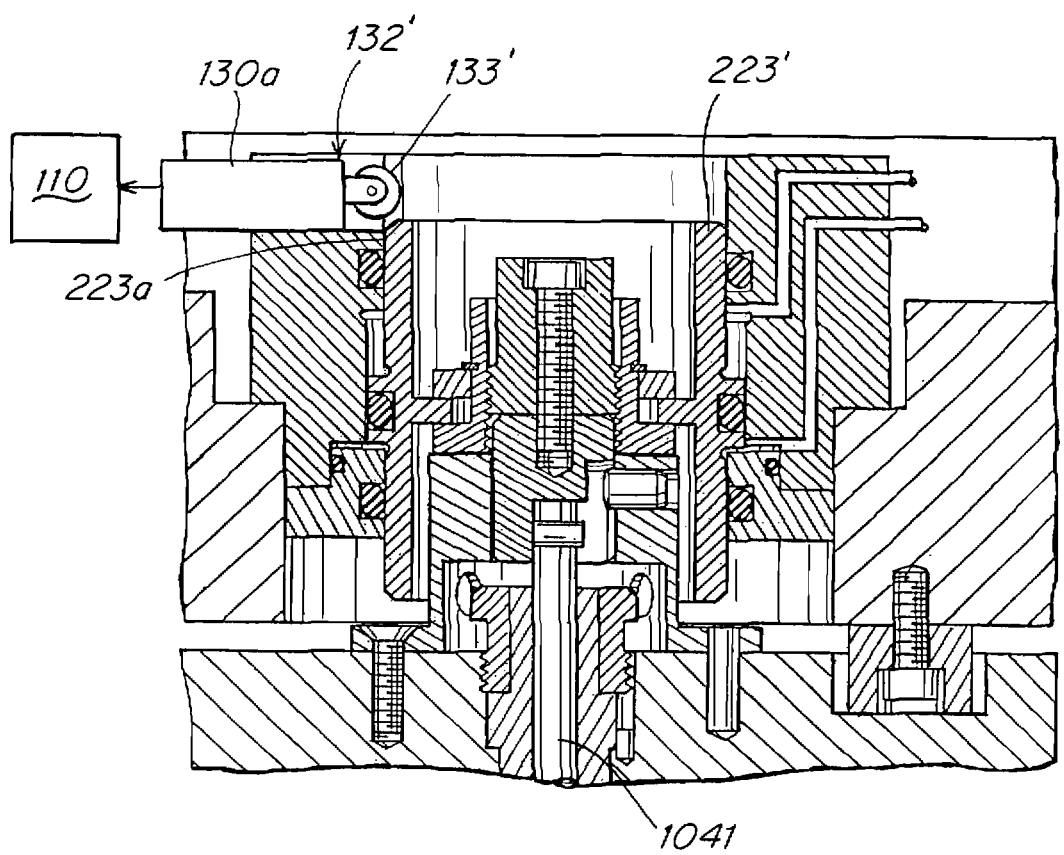
FIGS. 9C-9D show embodiments using limit switches that detect and signal specific positions of the actuator that can be used to determine velocity, position and switchover to higher openness of valve restrictor and/or upstream velocity of travel of the actuator and valve pin.
Figure 9D:
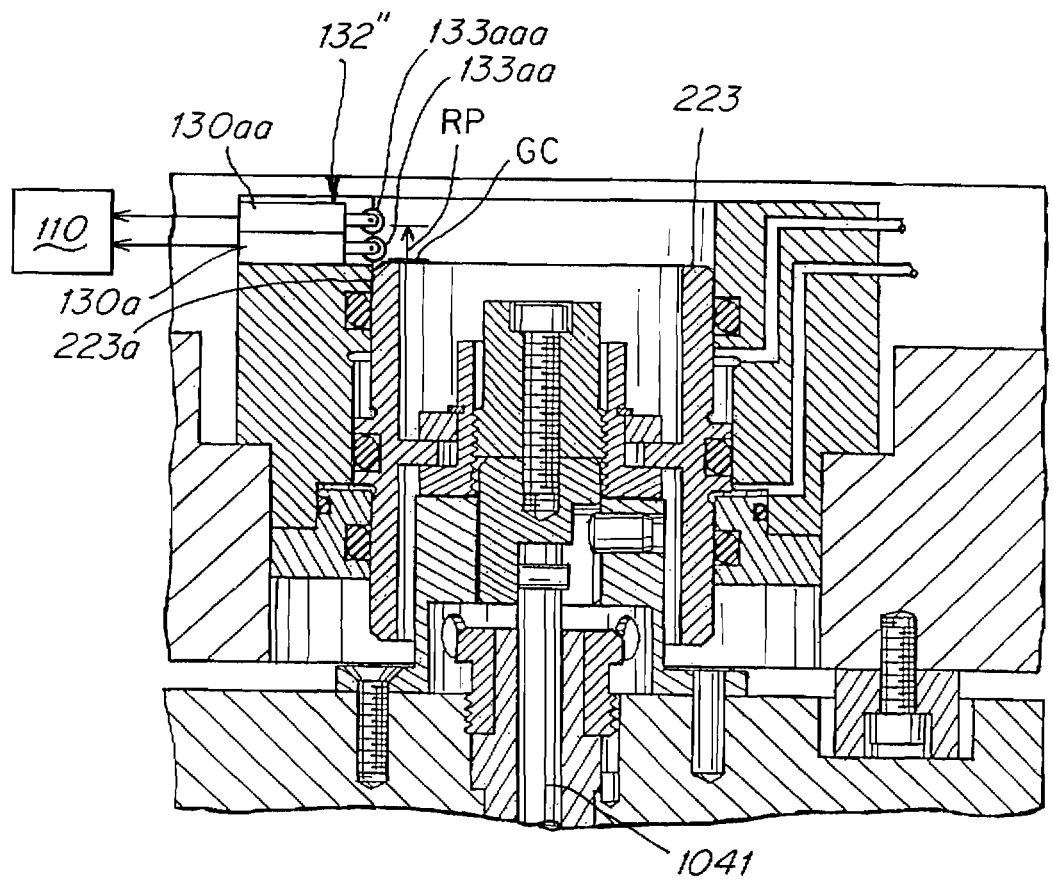

FIGS. 9A-9D show various examples of position sensors 100", 132', 132" the mounting and operation of which are described in U.S. Patent Publication no. 20090061034 the disclosure of which is incorporated herein by reference. As shown the position sensor of FIGS. 9A and 9B for example can track and signal the position of the piston of the actuator piston 223 continuously along its entire path of travel from which data pin velocity can be continuously calculated over the length of RP, RP2, RP3 via spring loaded follower 102" that is in constant engagement with flange 104" during the course of travel of piston 223. Mechanism 100" constantly sends signals to controller 110 in real time to report the position of pin 1041 and its associated actuator. FIGS. 9C, 9D show alternative embodiments using position switches that detect position at specific individual positions of the actuator and its associated valve pin 1041. The FIG. 9C embodiment uses a single trip position switch 130*a* with trip mechanism 133' that physically engages with the piston surface 223*a* when the piston 223 reaches the position of the trip mechanism 133'. The FIG. 9D embodiment shows the use of two separate position switches 130*a*, 130*aa* having sequentially spaced trips 133*aa* and 133*aaa* that report the difference in time or distance between each trip engaging surface 223*a* of the piston, the data from which can be used by controller 110 to calculate velocity of the actuator based on the time of travel of the actuator from tripping one switch 130*a* and then tripping the next 130*aa*. In each embodiment the position switch can signal the controller 110 when the valve pin 1041, 1042 has travelled to one or more selected intermediate upstream gate open positions between GC and RP, RP2 or RP3 so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

In alternative embodiments the controller 110 can include a processor and instructions that receive the pin position information and signals from the position sensor and calculate the real time velocity of the pin from the pin position data in real time at one or more times or positions over the course of the pin travel through the RP, RP2, RP3 path length and/or beyond. Typically such calculations of velocity are continuous throughout the cycle. In such an embodiment, the calculated pin velocity is constantly compared to a predetermined target profile of pin velocities and the velocity of the pin is adjusted in real time by the controller 110 to conform to the profile. In this embodiment as in all previously described embodiments, the pin is moved continuously upstream on the upstream part of the cycle at all times between the gate closed position and all positions upstream of the gate closed position. Such control systems are described in greater detail in for example U.S. Patent Publication no. 20090061034 the disclosure of which is incorporated herein by reference.

As discussed above, control over the velocity of pin movement in an embodiment where the pin is driven by a hydraulic or pneumatic actuator is typically accomplished by controlling the degree of openness of the fluid flow control valve 90, 500, control over velocity and drive rate or position of valve 90, 500 being the same functions in terms of the instructions, microprocessor design or computer software that carries out instructing and implementing the velocity or drive rate adjustment to the valve pin or actuator. Where the position sensing system senses the position of the pin or other component multiple times throughout the course of the pin or other component movement, and real time velocity can be calculated by the controller 110, a program or instructions can be alternatively used to receive a velocity data input by the user to the controller 110 as the variables to be stored and processed instead of a predetermined voltage or current generation in coil 610.

Figure 5A:
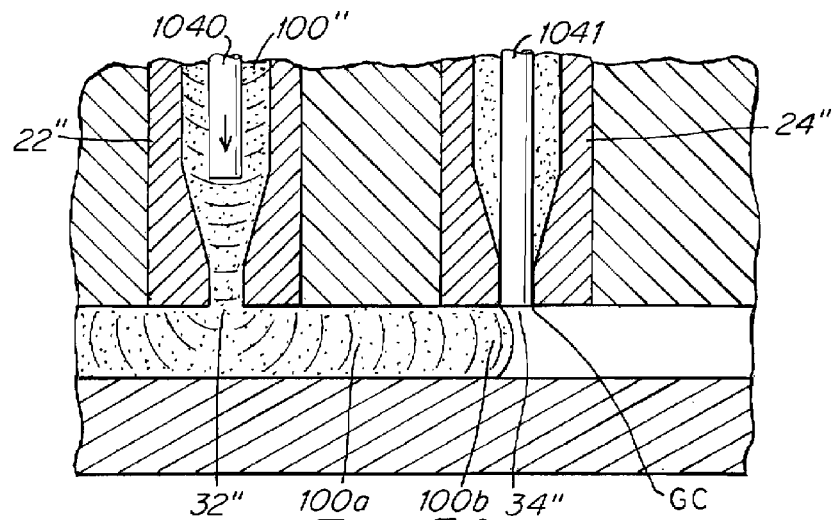
FIGS. 5A-5E are schematic cross-sectional close-up views of a cascade system having a center 32 and a downstream lateral 34 gate showing various stages of the progress of injection during the course of a reduced velocity withdrawal of at least the downstream valve pin 1041.
Figure 5B:
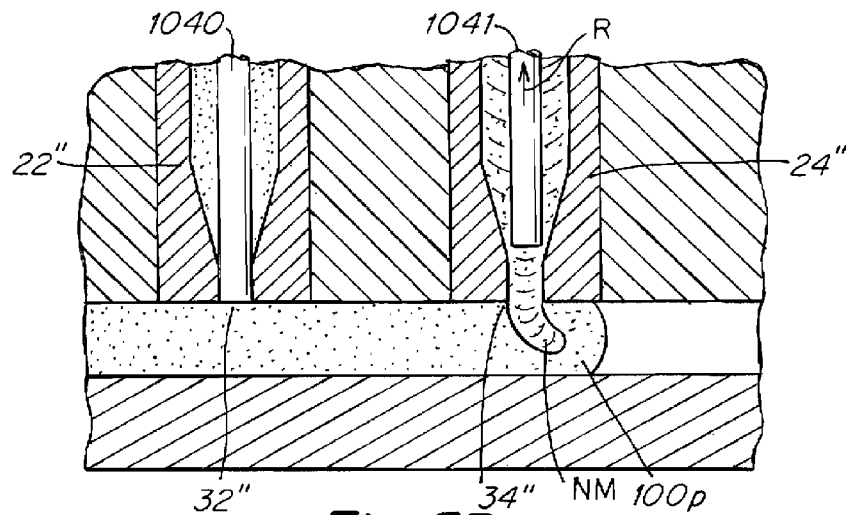
Figure 5C:
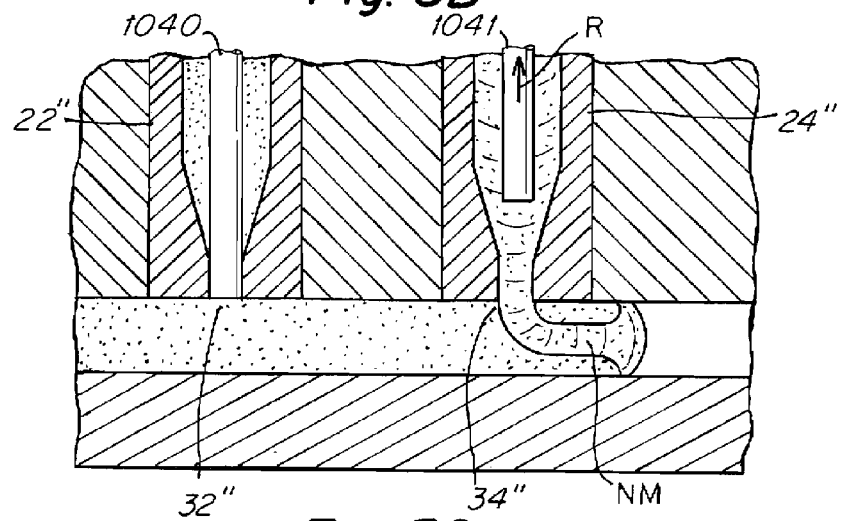
Figure 5D:
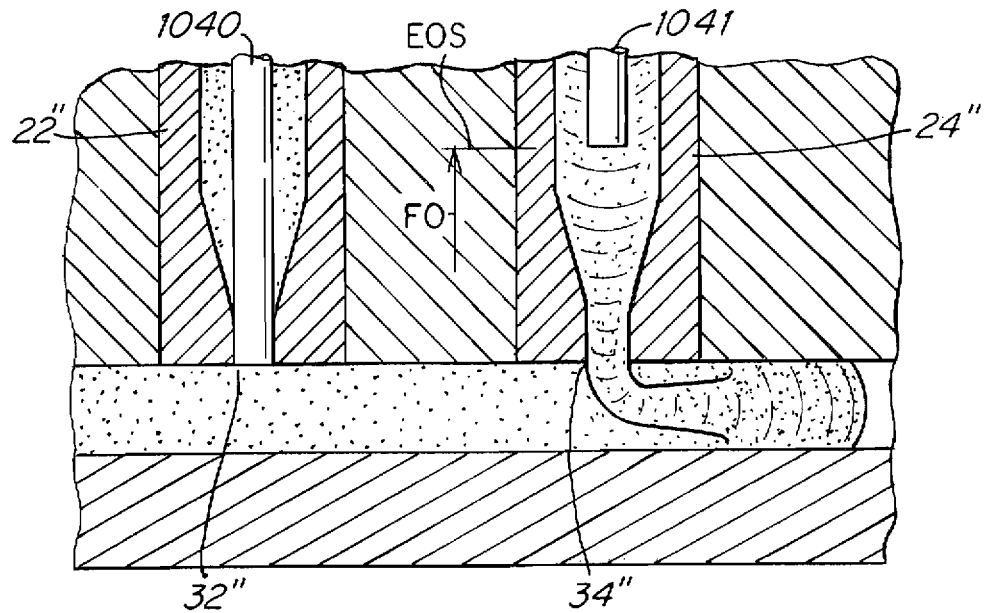
Figure 5E:
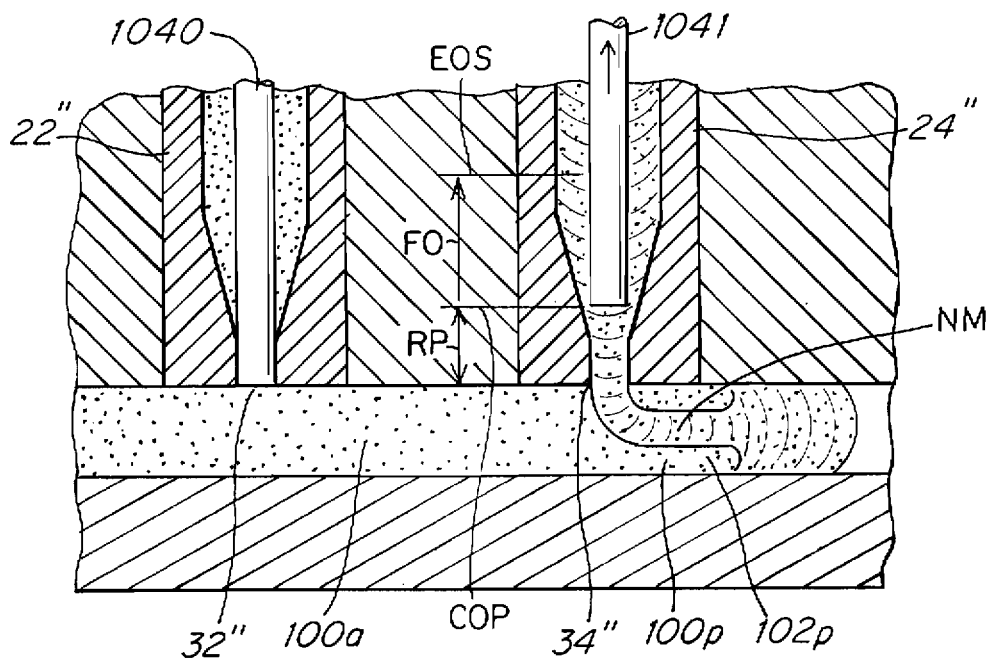

The system and method of the present invention can also be implemented in the same manner as described above regarding upstream withdrawal of the pin 45, 1041, to control the position and velocity of the pin 45, 1040, 1041 when it is driven beginning from an upstream maximum injection fluid flow position such as in FIG. 5C or 5D toward a downstream fully gate closed position as in FIGS. 6A, 7A such that the velocity of the pin can be controllably reduced to selected velocities that are less than maximum velocity over some portion or all of the paths RP, RP2, RP3 over which injection fluid flow can be reduced to less than maximum flow. Thus all of the discussion herein regarding control of the valve 90, 550 to control pin velocity and position during the upstream withdrawal portion of an injection cycle applies equally to control of pin velocity and position during the downstream closure portion of an injection cycle.

In another aspect of the invention, the user can program controller 110 via data inputs on a user interface to instruct the system 90, 500 to drive a pin 45, 1041 at one or more upstream velocities of travel for a predetermined amount of time that is reduced relative to a maximum velocity that the drive system 90, 500, 120 can drive the pins 45, 1041 to travel. Such reduced pin withdrawal rate or velocity is executed for a preselected amount of time that is less than the time of the entire injection cycle, the latter part of the injection cycle being executed with the pin 45, 1041 being withdrawn at higher velocities. A typical amount of time over which the pins are instructed to withdraw at a reduced velocity is between about 0.25 and about 10 seconds beginning from either a gate closed position or from a fully upstream gate open position, more typically between about 0.5 and about 5 seconds, the entire injection cycle time typically being between about 2 seconds and about 30 seconds, more typically between about 1 second and about 12 seconds.

In such an embodiment, the periods of time over which the pin 45, 1041 is withdrawn at reduced velocities are typically determined empirically by trial and error runs. One or more, typically multiple, trial injection cycle runs are carried out to make specimen parts from the mold. Each trial injection cycle run is carried out using a different period or periods of time at which the pin is withdrawn at one or more reduced velocities over the trial period(s) of time, and the quality of the parts produced from all such trial runs are compared to determine the optimum quality producing time(s) of reduced velocity pin withdrawals. When the optimum time(s) have been determined, the controller 110 is programmed to instruct the valve system 90, 500 to carry out an injection cycle where the pin withdrawal or closure velocities of pin 45, 1041 is reduced for the predetermined amounts of time at one or more predetermined reduced withdrawal (upstream) or closure (downstream) rates.

RP can be about 1-8 mm in length and more typically about 2-6 mm and even more typically 2-4 mm in length. The controller 110 instructs the valve system 90, 500 to control the velocity of travel, namely velocity of upstream travel, of a valve pin 45, 1041 beginning from either its gate closed position or from its fully upstream position for at least the predetermined amount of time that is selected to withdraw (upstream) or to close (drive downstream) the pin at the selected reduced velocity rate. In such an embodiment, the velocity of the upstream or downstream movement of the pin 45, 1041 is predetermined to occur for a select period of time rather than beginning from the gate closed position of the pin to less than 100% open.

What is claimed is:

1. Apparatus for performing an injection cycle comprising:
   a manifold that receives an injection fluid material, the manifold having or communicating with a delivery channel that delivers the injection fluid mold material under an injection pressure to a gate of a mold cavity,
   a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers,
   the actuator driving the valve pin upstream and downstream during a single injection cycle along a path of travel having a selected stroke length that extends between a first position where the valve pin prevents the injection fluid material from flowing into the cavity and one or more selected maximum flow positions at which the injection fluid material flows at a maximum rate through the gate into the cavity,
   the valve pin and the fluid delivery channel being adapted to vary rate of flow of the injection fluid material to less than the maximum rate when the valve pin is disposed at one or more selectable intermediate positions between the first position and the maximum flow position,
   the pneumatic actuator being controllably drivable to drive the pin upstream or downstream at one or more selectable reduced velocities that are less than the one or more maximum velocities,
   a pneumatic valve assembly that controls the rate of delivery of the pressurized gas from the source to and from the gas drive chambers of the pneumatic actuator to controllably drive the actuator and valve pin upstream and downstream, the pneumatic valve assembly comprising a cylinder housing having fluid delivery ports for delivering pressurized gas to and from the gas drive chambers of the actuator and a spool controllably and translationally drivable within the cylinder housing to selectively open and close the fluid delivery ports a selected degree to control flow of pressurized gas to and from the drive chambers,
   the pneumatic valve assembly including a drive device mounted to the spool, the drive device being controllably energizable to cause the spool to controllably slide along a back and forth path of lateral travel, the drive device being translationally movable along the back and forth path of lateral travel together with the spool and being supported during movement solely by mounting to the spool,
   the apparatus including a controller that receives position or pressure signal feedback and contains instructions that instruct the pneumatic valve assembly to cause the actuator to drive the valve pin through the one or more selectable intermediate positions over a selectable time or distance based on receipt of the real-time signal feedback.

2. The apparatus of claim 1 further comprising one or more sensors that sense the position of the valve pin or the actuator or the pressure of the injection fluid material continuously in real-time throughout the course of the injection cycle, the controller receiving continuous real-time pin position, actuator position or material pressure signal feedback from the one or more sensors and containing instructions that instruct the pneumatic valve assembly to drive the valve pin either upstream or downstream through a predetermined profile of positions or velocities during the course of the injection cycle based on the real-time position or pressure signal feedback.

3. The apparatus of claim 1 further comprising a sensor that senses the position of the valve pin or the actuator and sends a signal indicative of the sensed position to the controller, the controller including instructions that instruct the valve assembly to drive the actuator and valve pin upstream or downstream first at the one or more selectable reduced velocities and subsequently at the one or more maximum velocities upon receipt of a signal from the position sensor that indicates the valve pin or actuator are disposed at one or more predetermined positions along the stroke length.

4. The apparatus of claim 1 further comprising a sensor that senses the position of the valve pin or the actuator and sends a signal indicative of the sensed position to the controller, the controller including instructions that instruct the valve assembly to drive the valve pin to stop at a selected gate closed position, the controller including a program that establishes the sensed gate closed position as the first position of the injection cycle, the controller including instructions that instruct the valve assembly to begin an injection cycle by driving the valve pin to the established first position and stopping the valve pin on sensing of the valve pin at the established first position.

5. The apparatus of claim 1 wherein pneumatic valve assembly has an interior bore defined by an interior wall, the spool has one or more heads and recesses disposed between the heads, the heads have an outside surface integral with the heads that slidably engages with the interior wall of the cylinder housing to form a seal against flow of the pressurized gas between the engaged surfaces.

6. The apparatus of claim 1 wherein the drive device comprises an electrically conductive coil mounted to the spool, the coil being controllably energizable to cause the spool to controllably slide along a back and forth path of lateral travel, the electrically conductive coil being translationally movable along the back and forth path of lateral travel together with the spool and being supported during movement solely by mounting to the spool.

7. The apparatus of claim 1 wherein the cylinder of the valve assembly includes at least two gas exhaust ports that exhaust pressurized gas exiting from corresponding ones of the gas drive chambers to a source of ambient gas on selective slidable movement of the spool within the interior bore of the cylinder.

8. A method of performing an injection cycle comprising injecting injection fluid material into the manifold and through the gate of the apparatus of claim 1.

9. Apparatus for performing an injection molding cycle comprising:
a manifold that receives an injection fluid material, the manifold having or communicating with a delivery channel that delivers the injection fluid mold material under an injection pressure to a gate of a mold cavity,
a pneumatic actuator driven by a source of pressurized gas having a selected maximum pressure capable of driving the actuator and an interconnected valve pin at one or more maximum velocities, the pneumatic actuator comprising a pair of opposing first and second gas drive chambers,
the actuator driving the valve pin upstream and downstream along a path of travel having a selected stroke length that extends between a first position where the valve pin prevents the injection fluid material from flowing into the cavity and one or more selected maximum flow positions at which the injection fluid material flows at a maximum rate through the gate into the cavity,
the valve pin and the fluid delivery channel being adapted to vary rate of flow of the injection fluid material to less than the maximum rate when the valve pin is disposed at one or more selectable intermediate positions between the first position and the maximum flow position,
a pneumatic valve assembly that controls the rate of delivery of the pressurized gas from the source to and from the gas drive chambers of the pneumatic actuator to controllably drive the actuator and valve pin upstream and downstream,
the pneumatic actuator being controllably drivable to drive the pin upstream or downstream at one or more selectable reduced velocities that are less than the one or more maximum velocities,
the pneumatic valve assembly comprising a cylinder housing having fluid delivery ports for delivering pressurized gas to and from the gas drive chambers of the actuator, an interior bore defined by an interior wall and a spool having one or more heads and recesses disposed between the heads,
the valve assembly including at least two gas exhaust ports that exhaust pressurized gas exiting from corresponding ones of the gas drive chambers to a source of ambient gas on selective slidable movement of the spool within the interior bore of the cylinder,
the apparatus including a controller that receives position or pressure signal feedback and contains instructions that instruct the pneumatic valve assembly to cause the actuator to drive the valve pin through the one or more selectable intermediate positions over a selectable time or distance based on receipt of the real-time signal feedback.

10. The apparatus of claim 9 further comprising one or more sensors that sense the position of the valve pin or the actuator or the pressure of the injection fluid material continuously in real-time throughout the course of the injection cycle, the controller receiving continuous real-time pin position, actuator position or material pressure signal feedback from the one or more sensors and containing instructions that instruct the pneumatic valve assembly to drive the valve pin either upstream or downstream through a predetermined profile of positions or velocities during the course of the injection cycle based on the real-time position or pressure signal feedback.

11. The apparatus of claim 9 further comprising a sensor that senses the position of the valve pin or the actuator and sends a signal indicative of the sensed position to the controller, the controller including instructions that instruct the valve assembly to drive the actuator and valve pin upstream or downstream first at the one or more selectable reduced velocities and subsequently at the one or more maximum velocities upon receipt of a signal from the position sensor that indicates the valve pin or actuator are disposed at one or more predetermined positions along the stroke length.

12. The apparatus of claim 9 further comprising a sensor that senses the position of the valve pin or the actuator and sends a signal indicative of the sensed position to the controller, the controller including instructions that instruct the valve assembly to drive the valve pin to stop at a selected gate closed position, the controller including a program that establishes the sensed gate closed position as the first position of the injection cycle, the controller including instructions that instruct the valve assembly to begin an injection cycle by driving the valve pin to the established first position and stopping the valve pin on sensing of the valve pin at the established first position.

13. The apparatus of claim 9 wherein pneumatic valve assembly has an interior bore defined by an interior wall, the heads have an outside surface integral with the heads that slidably engages with the interior wall of the cylinder housing to form a seal against flow of the pressurized gas between the engaged surfaces.

14. The apparatus of claim 9 wherein a drive device is mounted to the spool and the drive device comprises an electrically conductive coil mounted to the spool, the coil being controllably energizable to cause the spool to controllably slide along a back and forth path of lateral travel, the electrically conductive coil being translationally movable along the back and forth path of lateral travel together with the spool and being supported during movement solely by mounting to the spool.

15. The apparatus of claim 9 wherein the cylinder of the valve assembly includes at least two gas exhaust ports that exhaust pressurized gas exiting from corresponding ones of the gas drive chambers to a source of ambient gas on selective slidable movement of the spool within the interior bore of the cylinder.

16. A method of performing an injection cycle comprising injecting injection fluid material into the manifold and through the gate of the apparatus of claim 9.

* * * * *